United States Patent
Ly et al.

(10) Patent No.: US 11,785,491 B2
(45) Date of Patent: Oct. 10, 2023

(54) SERVICE-ASSOCIATED REFERENCE SIGNALS

(71) Applicant: QUALCOMM Incorporated, San Diego, CA (US)

(72) Inventors: Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/466,779

(22) Filed: Sep. 3, 2021

(65) Prior Publication Data

US 2022/0078653 A1 Mar. 10, 2022

Related U.S. Application Data

(60) Provisional application No. 63/076,919, filed on Sep. 10, 2020.

(51) Int. Cl.
*H04W 24/10* (2009.01)
*H04L 5/00* (2006.01)
*H04W 76/10* (2018.01)

(52) U.S. Cl.
CPC .......... *H04W 24/10* (2013.01); *H04L 5/0048* (2013.01); *H04W 76/10* (2018.02)

(58) Field of Classification Search
CPC ...... H04W 24/10; H04W 76/10; H04L 5/0048
USPC ....................................................... 370/252
See application file for complete search history.

(56) References Cited

U.S. PATENT DOCUMENTS

| | | | |
|---|---|---|---|
| 2018/0220317 A1* | 8/2018 | Yilmaz | H04L 5/006 |
| 2018/0279218 A1* | 9/2018 | Park | H04W 48/20 |
| 2019/0141742 A1* | 5/2019 | Zhou | H04L 5/0064 |
| 2019/0174440 A1 | 6/2019 | Kwak et al. | |

FOREIGN PATENT DOCUMENTS

EP  3706381 A1  9/2020

OTHER PUBLICATIONS

International Search Report and Written Opinion—PCT/US2021/049506—ISA/EPO—dated Jan. 4, 2022.

* cited by examiner

*Primary Examiner* — Christopher R Crompton
(74) *Attorney, Agent, or Firm* — Holland & Hart / Qualcomm

(57) ABSTRACT

Methods, systems, and devices for wireless communications are described. In some systems, a transmitting device may transmit a reference signal indicating a first service type supported by the transmitting device and a receiving device may receive the reference and determine whether to measure a signal strength associated with the reference signal based on determining whether the first service type supported by the transmitting device and a second service type supported by the receiving device are a same service type. For example, the receiving device may measure the reference signal if the first service type indicated by the reference signal and the second service type supported by the receiving device are the same service type. Alternatively, the receiving device may refrain from measuring the reference signal if the first service type indicated by the reference signal and the second service type supported by the receiving device are different service types.

30 Claims, 17 Drawing Sheets

| Reference Signal 315 | Measurement Report 320 |

SERVICE-ASSOCIATED REFERENCE SIGNALS

CROSS REFERENCE

The present Application for Patent claims the benefit of U.S. Provisional Patent Application No. 63/076,919 by Ly et al., entitled "TECHNIQUES FOR MEASURING SERVICE-ASSOCIATED REFERENCE SIGNALS," filed Sep. 10, 2020, assigned to the assignee hereof, and expressly incorporated by reference herein.

TECHNICAL FIELD

The following relates to wireless communications, including service-associated reference signals.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate via one or more relay nodes. In some cases, such as in cases in which an existing link between the UE and a relay node deteriorates, the UE may perform a handover procedure, via a different relay node, to re-establish a connection with the base station or to establish a connection with a different base station. During the handover procedure, a device (which may be referred to as a receiving device and which may be the UE, a relay node, or a base station) in the system may measure reference signals transmitted by one or more other devices (which may be referred to as transmitting devices and which may be one or more of the UE, a relay node, or a base station) to determine which link provides a sufficient signal strength for communication between the UE and the base station.

Different devices, such as relay nodes and base stations, may support different service types (which may be associated with different quality of service (QoS) constraints) and the UE may attempt to establish a connection with a base station and a relay node that support at least a service type that is also supported by the UE. In some cases, however, the receiving device may be unable to determine the service types supported by a transmitting device until after measuring the reference signals, transmitting a measurement report to the transmitting device, establishing a connection with the transmitting device, and reporting its capability. As such, the receiving device may determine that the transmitting device does not support the same service type as the receiving device after measuring one or more reference signals, transmitting a measurement report to the transmitting device, establishing a connection with the transmitting device, and reporting its capability, which may result in inefficient processing and resource usage and unnecessary transmission by the receiving device.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a transmitting device. The method may include transmitting, to a receiving device, a reference signal indicating a first service type supported by the transmitting device, the first service type corresponding to a first quality of service (QoS), monitoring for a measurement report from the receiving device based on transmitting the reference signal indicating the first service type, and selectively establishing a connection with the receiving device based on whether the measurement report is received from the receiving device during the monitoring.

Another innovative aspect of the subject matter described in this disclosure can be implemented in an apparatus for wireless communication at a transmitting device. The apparatus may include a processor, memory coupled with the processor, and instructions stored in the memory. The instructions may be executable by the processor to cause the apparatus to transmit, to a receiving device, a reference signal indicating a first service type supported by the transmitting device, the first service type corresponding to a first QoS, monitor for a measurement report from the receiving device based on transmitting the reference signal indicating the first service type, and selectively establish a connection with the receiving device based on whether the measurement report is received from the receiving device during the monitoring.

Another innovative aspect of the subject matter described in this disclosure can be implemented in another apparatus for wireless communication at a transmitting device. The apparatus may include means for transmitting, to a receiving device, a reference signal indicating a first service type supported by the transmitting device, the first service type corresponding to a first QoS, monitoring for a measurement report from the receiving device based on transmitting the reference signal indicating the first service type, and selectively establishing a connection with the receiving device based on whether the measurement report is received from the receiving device during the monitoring.

Another innovative aspect of the subject matter described in this disclosure can be implemented in a non-transitory computer-readable medium storing code for wireless communication at a transmitting device. The code may include instructions executable by a processor to transmit, to a receiving device, a reference signal indicating a first service type supported by the transmitting device, the first service type corresponding to a first QoS, monitor for a measurement report from the receiving device based on transmitting the reference signal indicating the first service type, and selectively establish a connection with the receiving device based on whether the measurement report is received from the receiving device during the monitoring.

In some examples of the method, apparatuses, and non-transitory computer-readable medium described herein, transmitting the reference signal indicating the first service type may include operations, features, means, or instructions for transmitting the reference signal over a first resource, the first resource corresponding to the first service type.

In some examples of the method, apparatuses, and non-transitory computer-readable medium described herein, transmitting the reference signal indicating the first service type may include operations, features, means, or instructions for transmitting the reference signal using a first sequence that is based on an identifier (ID) associated with the first service type.

In some examples of the method, apparatuses, and non-transitory computer-readable medium described herein, transmitting the reference signal indicating the first service type may include operations, features, means, or instructions for transmitting the reference signal based on a first cell ID associated with the first service type.

In some examples of the method, apparatuses, and non-transitory computer-readable medium described herein, determining the first cell ID associated with the first service type may include operations, features, means, or instructions for determining a set of cell IDs corresponding to the first service type, and selecting the first cell ID from the set of cell IDs.

Some examples of the method, apparatuses, and non-transitory computer-readable medium described herein may further include operations, features, means, or instructions for transmitting, to the receiving device, an indication of a mapping between a first set of service types and a second set of reference signal types, the first set of service types including the first service type and the reference signal being associated with one of the second set of reference signal types.

One innovative aspect of the subject matter described in this disclosure can be implemented in a method for wireless communication at a receiving device. The method may include receiving, from a transmitting device, a reference signal indicating a first service type, measuring a signal strength associated with the reference signal based on receiving the reference signal indicating the first service type and on the first service type being a same service type as a second service type supported by the receiving device that corresponds to a first QoS, and communicating with the transmitting device or a second transmitting device based on measuring the signal strength associated with the reference signal.

Another innovative aspect of the subject matter described in this disclosure can be implemented in an apparatus for wireless communication at a receiving device. The apparatus may include a processor, memory coupled with the processor, and instructions stored in the memory. The instructions may be executable by the processor to cause the apparatus to receive, from a transmitting device, a reference signal indicating a first service type, measure a signal strength associated with the reference signal based on receiving the reference signal indicating the first service type and on the first service type being a same service type as a second service type supported by the receiving device that corresponds to a first QoS, and communicate with the transmitting device or a second transmitting device based on measuring the signal strength associated with the reference signal.

Another innovative aspect of the subject matter described in this disclosure can be implemented in another apparatus for wireless communication at a receiving device. The apparatus may include means for receiving, from a transmitting device, a reference signal indicating a first service type, measuring a signal strength associated with the reference signal based on receiving the reference signal indicating the first service type and on the first service type being a same service type as a second service type supported by the receiving device that corresponds to a first QoS, and communicating with the transmitting device or a second transmitting device based on measuring the signal strength associated with the reference signal.

Another innovative aspect of the subject matter described in this disclosure can be implemented in a non-transitory computer-readable medium storing code for wireless communication at a receiving device. The code may include instructions executable by a processor to receive, from a transmitting device, a reference signal indicating a first service type, measure a signal strength associated with the reference signal based on receiving the reference signal indicating the first service type and on the first service type being a same service type as a second service type supported by the receiving device that corresponds to a first QoS, and communicate with the transmitting device or a second transmitting device based on measuring the signal strength associated with the reference signal.

In some examples of the method, apparatuses, and non-transitory computer-readable medium described herein, communicating with the transmitting device or the second transmitting device may include operations, features, means, or instructions for transmitting, to the transmitting device, a measurement report based on measuring the signal strength associated with the reference signal.

Some examples of the method, apparatuses, and non-transitory computer-readable medium described herein may further include operations, features, means, or instructions for receiving, from the second transmitting device, a second reference signal indicating a third service type, and measuring a second signal strength associated with the second reference signal based on receiving the second reference signal indicating the third service type and on the third service type being a same service type as the second service type supported by the receiving device.

In some examples of the method, apparatuses, and non-transitory computer-readable medium described herein, communicating with the transmitting device or the second transmitting device may include operations, features, means, or instructions for transmitting, to the second transmitting device, a measurement report based on measuring the second signal strength associated with the second reference signal.

In some examples of the method, apparatuses, and non-transitory computer-readable medium described herein, the receiving device may be associated with the second service type and a third service type. In such examples, communicating with the transmitting device or the second transmitting device may include operations, features, means, or instructions for transmitting, to the transmitting device, a first measurement report of a first measurement report group associated with the second service type, and transmitting, to the second transmitting device, a second measurement report of a second measurement report group associated with the third service type.

In some examples of the method, apparatuses, and non-transitory computer-readable medium described herein, the first service type may be expected to be supported by the transmitting device based on receiving the reference signal.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
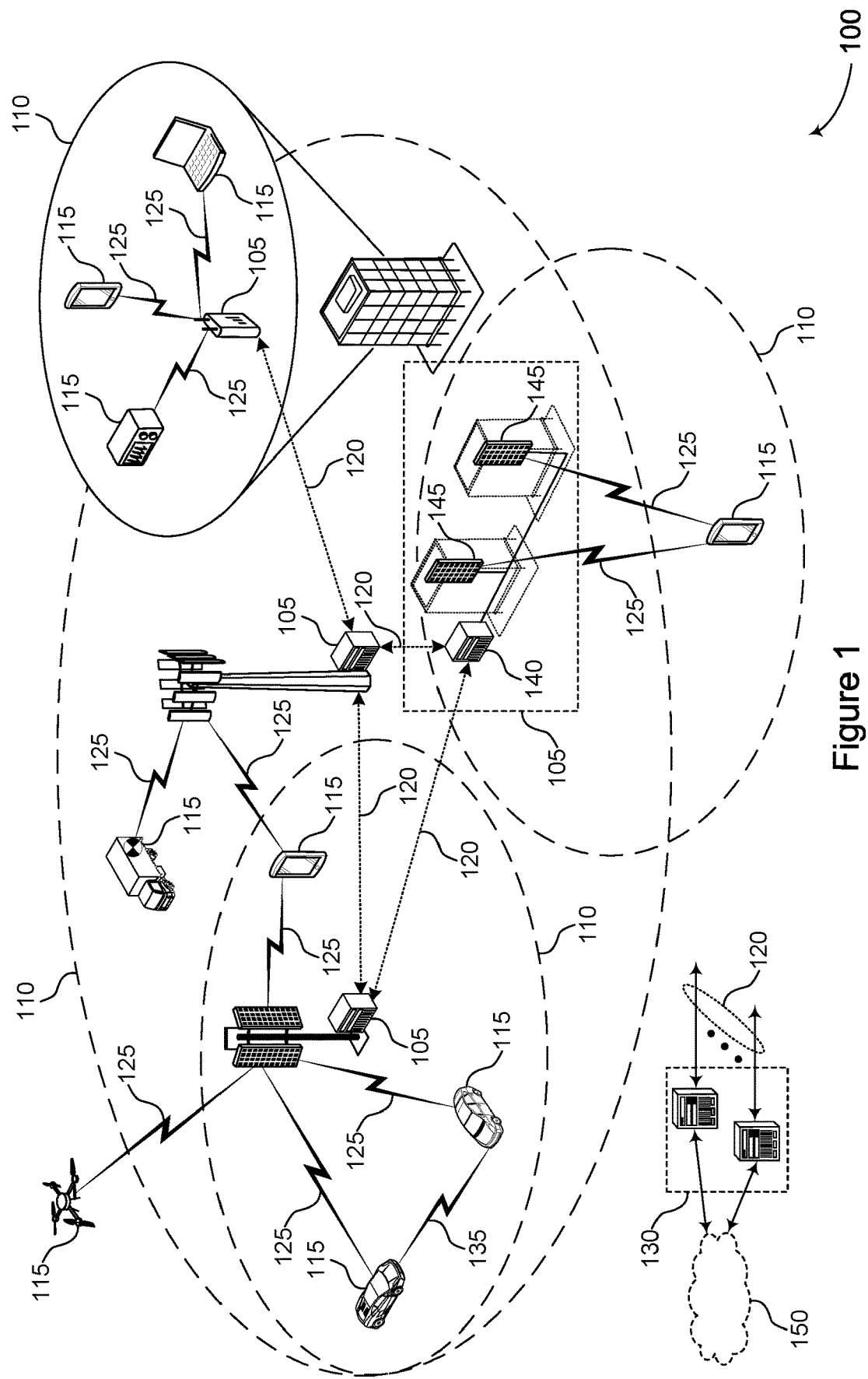
FIGS. 1 and 2 illustrate examples of wireless communications systems that support service-associated reference signals in accordance with aspects of the present disclosure.

Various aspects generally relate to service-associated reference signals that enable devices receiving the reference signals to determine a service type supported by the device transmitting the reference signals. In some aspects, a receiving device determines whether to measure a signal strength associated with a service-associated reference signal, and to transmit a measurement report including the measured signal strength, based on whether a service type indicated by the reference signal is the same as a service type supported by the receiving device. For instance, in examples in which the receiving device supports a first service type and determines that the transmitting device also supports the first service type based on receiving the reference signal, the receiving device may measure the reference signal and transmit a measurement report to the transmitting device based on the measurement. Alternatively, in examples in which the receiving device supports the first service type and determines that the transmitting device supports a second service type (a different service type) based on receiving the reference signal, the receiving device may refrain from measuring the reference signal and may also refrain from transmitting a measurement report to the transmitting device. The transmitting device may indicate the service type supported by the transmitting device via the reference signal in one or more ways, and one or both of the transmitting device or the receiving device may determine a mapping between different service types and different reference signal types (for example, a base station or a relay node may configure the mapping and transmit an indication of the mapping to a user equipment (UE)). In some examples, the one or more ways according to which the transmitting device may indicate different service types supported by the transmitting device is by transmitting reference signals of different types in accordance with the mapping. Such different reference signal types may refer to reference signals transmitted over different resources, reference signals transmitted using different sequences, reference signals transmitted based on different cell identifiers (IDs), reference signals that include different indications of a service type (for example, within a payload of the reference signal), or a combination thereof.

Particular aspects of the subject matter described in this disclosure can be implemented to realize one or more of the following potential advantages. In some aspects, the described techniques can be used to avoid potentially unnecessary transmission of measurement reports from a receiving device, and generally to provide for more efficient resource usage. For example, based on refraining from measuring a signal strength associated with reference signals that indicate a service type that is not supported by the receiving device, the receiving device may achieve greater power savings and increased battery life. Further, based on refraining from transmitting a measurement report for such reference signals that indicate a service type that is not supported by the receiving device, the receiving device may avoid using resources for the transmission of the measurement report, which may also improve power savings at the receiving device while also increasing the capacity of the system (as other devices may use the resources left unused by the receiving device). As such, the described techniques can be used to provide for greater power savings, higher data rates, and greater spectral efficiency, among other benefits.

FIG. 1 illustrates an example of a wireless communications system 100 that supports service-associated reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, and the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs.

In some examples, a single BWP for a carrier may be active at a given time and communications for the UE 115 may be restricted to one or more active BWPs.

The time intervals for the base stations 105 or the UEs 115 may be expressed in multiples of a basic time unit, which may, for example, refer to a sampling period of $T_s=1/(\Delta f_{max} \cdot N_f)$ seconds, in which $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an ID for distinguishing neighboring cells (for example, a physical cell ID (PCID), a virtual cell ID (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback such that the device may provide HARQ feedback in a specific slot for data received in a previous symbol in the slot. In other examples, the device may provide HARQ feedback in a subsequent slot, or according to some other time interval.

In some examples, a UE 115 and a base station 105 may communicate directly over a communication link 125, which may be an example of a Uu communication link. In some other examples, a UE 115 and a base station 105 may communicate indirectly over a communication link 135, which may be an example a PC5 communication link. For example, the wireless communications system 100 may support NR sidelink communication between two or more peer devices. In such examples of PC5 communication, the UE 115 may communicate with the base station 105 via a relay node, which may be another UE 115.

In some aspects, the link quality of a communication link associated with the UE 115 (such as the communication link 125 or the communication link 135) may deteriorate and, in some examples, the UE 115 may participate in a handover procedure from the base station 105 or a source relay node to a target base station or a target relay node. For example, in examples in which the UE 115 initially communicates with the base station 105 directly over the communication link 125 and the link quality of the communication link 125 deteriorates (for example, falls below a threshold link quality), the UE 115 may participate in a handover procedure from the base station 105 to the target relay node to improve an overall link quality between the UE 115 and the base station 105 or a different base station 105. Alternatively, in examples in which the UE 115 initially communicates with the base station 105 indirectly via the source relay node over the communication link 135 and the link quality of the communication link 135 deteriorates (for example, falls below a threshold link quality), the UE 115 may participate in a handover procedure from the source relay node to the target relay node to improve the overall link quality between the UE 115 and the base station 105 (or a different base station 105).

In some examples, such a handover procedure to a relay node may be a downlink-led handover procedure, in which one or more relay nodes may transmit reference signals to the UE 115 and the UE 115 may measure a signal strength associated with each of the reference signals received from the relay nodes to determine with which relay node to establish a connection. In some other examples, such a handover procedure to a relay node may be an uplink-led handover procedure, in which the UE 115 may transmit reference signals to one or more relay nodes, the relay nodes may measure a signal strength associated with each of the reference signals received from UE 115, and the UE 115 may determine with which relay node to establish a connection based on receiving measurement reports from the relay nodes.

Additionally, in either or both examples, the UE 115 may determine a service type supported by the UE 115 and may attempt to establish a connection with a relay node or a base station that supports the same service type as the service type supported by the UE 115. For example, the UE 115 may determine the service type supported by the one or more relay nodes from or to which the UE 115 receives or transmits reference signals after communication of measurement reports, establishing a connection with the relay nodes, and reporting respective capabilities, and the UE 115 may attempt to connect to a relay node based on determining that the relay node supports the same service type as the UE 115. Likewise, the UE 115 may refrain from attempting to connect to a relay node that does not support the same service type as the UE 115. Such determination of which relay nodes support the same service type as the UE 115 after measuring reference signals and communicating one or more measurement reports may result in inefficient resource usage in examples in which the UE 115 determines that the relay node does not support the same service type as the UE 115. For example, the UE 115 may measure a reference signal transmitted by a relay node and transmit a measurement report associated with the measured reference signal to the relay node and may subsequently determine that the relay node does not support the same service type as the UE 115. As such, the resources used by the UE 115 to transmit the measurement report are effectively wasted.

In some implementations of the present disclosure, a transmitting device (for example, the device that transmits the reference signal, such as a UE 115 in examples of an uplink-led handover procedure or a relay node or a base station in examples of a downlink-led handover procedure) may indicate a supported service type via a reference signal. For instance, in some examples, the transmitting device may transmit the reference signal over a first resource that corresponds to or otherwise indicates the supported service type. In some other examples, the transmitting device may generate a sequence based on the supported service type and transmit the reference signal using the generated sequence. In some other examples, the transmitting device may determine a cell ID associated with the supported service type and transmit the reference signal based on the determined cell ID.

Likewise, a receiving device (for example, the device that receives the reference signal, such as a relay node or a base station in examples of an uplink-led handover procedure or a UE 115 in examples of a downlink-led handover procedure) may receive the reference signal and determine the service type that is supported by the transmitting device based on receiving the reference signal. In examples in which the receiving device determines that the service type supported by the transmitting device is the same as a service type supported by the receiving device, the receiving device may measure a signal strength associated with the reference signal and transmit a measurement report to the transmitting device. Alternatively, in examples in which the receiving device determines that the service type supported by the transmitting device is different than the service type supported by the receiving device, the receiving device may refrain from measuring the signal strength associated with the reference signal and may likewise refrain from transmitting the measurement report to the transmitting device.

As such, the receiving device may transmit a measurement report to the transmitting device in examples in which the receiving device and the transmitting device support the same service type and may refrain from transmitting the measurement report to the transmitting device in examples in which the receiving device and the transmitting device do not support the same service type, which may result in more efficient resource usage by the receiving device. Such more efficient resource usage may, in turn, result in greater capacity and a greater achievable throughput in the wireless communications system 100.

Figure 2:
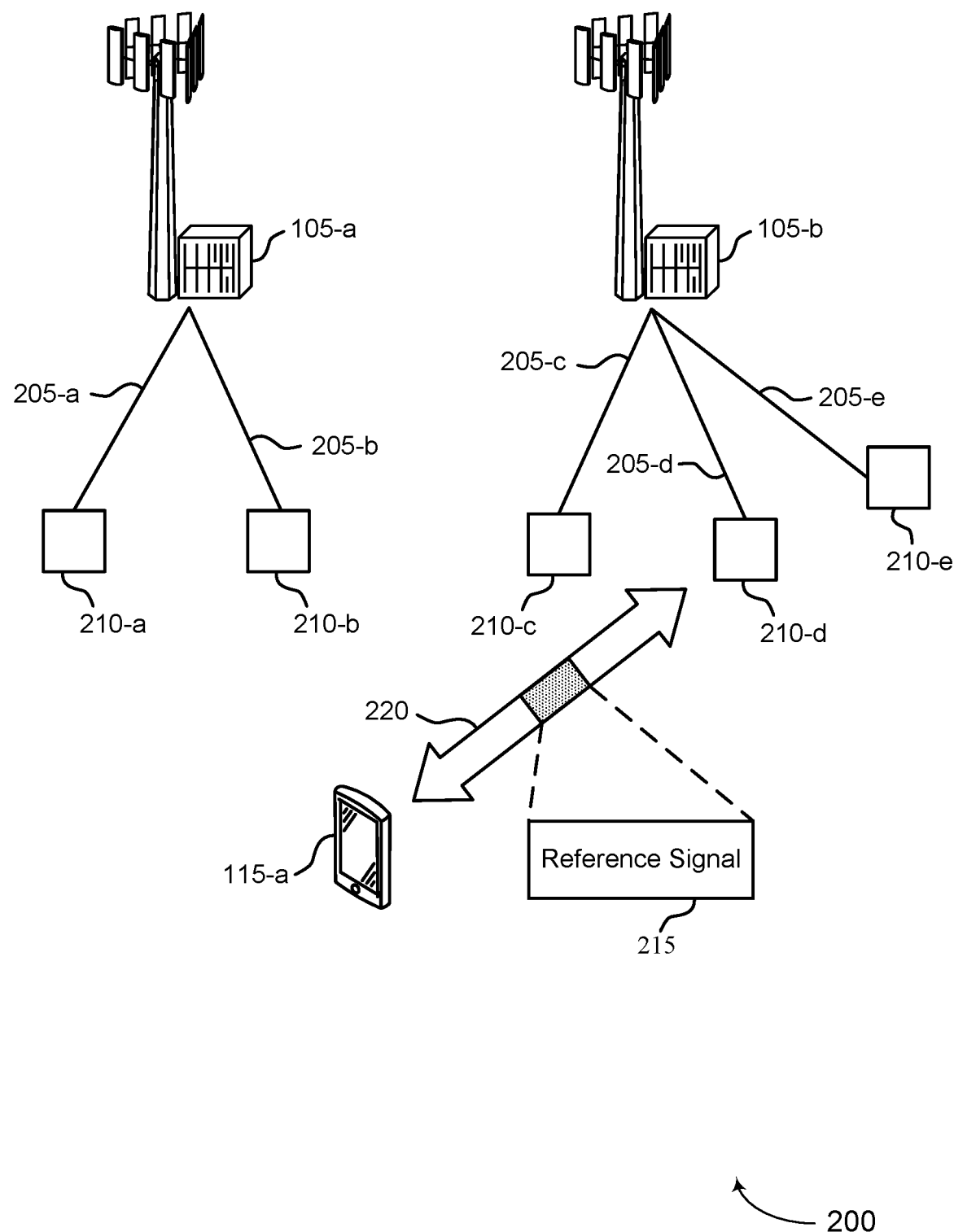

FIG. 2 illustrates an example of a wireless communications system 200 that supports service-associated reference signals in accordance with aspects of the present disclosure.

In some examples, the wireless communications system 200 may implement aspects of the wireless communications system 100. The wireless communications system 200 may illustrate a system including a base station 105-*a*, a base station 105-*b*, a UE 115-*a*, and relay nodes 210, which may be examples of corresponding devices described herein. In some examples, the UE 115-*a*, which may be an example of a remote UE 115, may participate in a mobility procedure and attempt to establish a connection with either the base station 105-*a* or the base station 105-*b* via a relay node 210 based on transmitting or receiving reference signals 215 that indicate a supported service type.

For example, the base station 105-*a* and the base station 105-*b* may support NR sidelink and may likewise support indirect communication with the UE 115-*a* via one or more relay nodes 210, which may be examples of other UEs 115, TRPs, IAB nodes, or any other devices capable of relaying wireless communication between a UE 115 and a base station 105. For instance, the base station 105-*a* may communicate with a relay node 210-*a* and a relay node 210-*b* via a communication link 205-*a* and a communication link 205-*b* (which may be examples of Uu links), respectively, and either of the relay node 210-*a* or the relay node 210-*b* may establish a sidelink 220 (such as a PC5 link) with the UE 115-*a* and communicate with the UE 115-*a* over the sidelink 220. Similarly, the base station 105-*b* may communicate with a relay node 210-*c* via a communication link 205-*c*, a relay node 210-*d* over a communication link 205-*d*, and a relay node 210-*e* over a communication link 205-*e*, and any of the relay node 210-*c*, the relay node 210-*d*, or the relay node 210-*e* may establish a sidelink 220 (such as a PC5 link) with the UE 115-*a* and communicate with the UE 115-*a* over the sidelink 220.

In some examples, the UE 115-*a* or a base station 105 (the base station 105-*a* or the base station 105-*b*) may determine that a radio link quality of a current communication link between the UE 115-*a* and the base station 105 (which may be a direct communication link, such as a Uu link, or an indirect link via a relay node 210) falls below a threshold radio link quality and may initiate a mobility procedure (such as a handover procedure) for the UE 115-*a*. The UE 115-*a*, based on the mobility procedure, may transition from a connection with the base station 105-*a* or the base station 105-*b* to a connection with a relay node 210, may transition from a connection with a first relay node 210 (a source relay node 210) to a second relay node 210 (a target relay node 210), or may transition from a connection with a first base station 105 to a second base station 105. In any case, the UE 115-*a* may transmit or receive reference signals 215 to or from one or more of the relay nodes 210 or base stations 105 to determine which relay node 210 or base station 105 provides a greatest signal strength for communication between the UE 115-*a* and the base station 105 (the base station 105-*a* or the base station 105-*b*). For example, the UE 115-*a* may transmit or receive a reference signal 215 to or from each if not all of the relay nodes 210 or the base stations 105 and, in some examples, the receiving device (the UE 115-*a* in downlink-led mobility or a relay node 210 or a base station 105 in uplink-led mobility) may measure a signal strength associated with each received reference signal and may transmit a measurement report associated with the received reference signal to the transmitting device (the UE 115-*a* in uplink-led mobility or a relay node 210 or a base station 105 in downlink-led mobility).

In such examples, the receiving device may measure the signal strength associated with each received reference signal without knowledge of the service type supported by the transmitting device, which may result in an inefficient usage of resources in examples in which the UE 115-a and a relay node 210 or a base station 105 support different service types. For example, one of the UE 115-a, the relay node 210, or the base station 105 may measure a reference signal transmitted by one of the other devices, may transmit a measurement report associated with the measured reference signal to the transmitting device, may establish a connection with the transmitting device, and report its capability and, in examples in which the UE 115-a and the relay node 210 or the base station 105 do not support the same service types, the UE 115-a may refrain from communicating with the relay node 210 or the base station 105 regardless of the measured signal strength. In other words, the UE 115-a and the relay node 210 or the base station 105 may refrain from communicating with each other if they do not support the same service types, even in examples in which the measured signal strength between the UE 115-a and the relay node 210 or the base station 105 is greater than a threshold signal strength. As such, any processing power used by the receiving device to measure the reference signal 215 sent by the transmitting device and any resources used by the receiving device to transmit the corresponding measurement report may be effectively wasted, as the measured signal strength may not be considered during the mobility procedure because the UE 115-a and the relay node 210 or the base station 105 do not support the same service type.

In some implementations of the present disclosure, the transmitting device and the receiving device may support service-associated reference signals 215 that indicate a service type supported by the transmitting device. As such, the receiving device may receive the reference signal 215 and determine the service type associated with the transmitting device prior to measuring and reporting a signal strength associated with the reference signal 215. As such, the receiving device may compare the service type indicated by the reference signal 215 to a service type supported by the receiving device and determine whether the two service types are the same or are different. In examples in which the two service types are different, the receiving device may refrain from measuring and reporting the signal strength associated with the reference signal 215. Alternatively, in examples in which the two service types are the same, the receiving device may measure and report the signal strength associated with the reference signal 215 to the transmitting device.

For example, the relay node 210-d may transmit the reference signal 215 to the UE 115-a (such that the relay node 210-d may function as the transmitting device and the UE 115-a may function as the receiving device), and the reference signal 215 may indicate a first service type supported by the relay node 210-d (or by the base station 105-b to which the relay node 210-d is connected). The UE 115-a, based on receiving the reference signal 215, may determine that the relay node 210-d supports the first service type and may compare the first service type to a second service type that is supported by the UE 115-a. In some examples, the UE 115-a may determine that the first service type and the second service type are different and, as such, may refrain from measuring and reporting the signal strength associated with the reference signal 215 to the relay node 210-d. In some other examples, the UE 115-a may determine that the first service type and the second service type are the same and, as such, may measure and report the signal strength associated with the reference signal 215 to the relay node 210-d.

Such a service-associated reference signal 215 may, among other aspects, indicate the service type supported by the transmitting device. For example, the different service types supported by the UE 115-a, a relay node 210, or a base station 105 may include one or both of an eMBB service type, a URLLC service type, or an MTC service type, among other examples, and the reference signal 215 may indicate one or more of the eMBB service type, the URLLC service type, or the MTC service type (according to which of the service types, among other examples, is supported by the transmitting device, if not all three). In some aspects, different service types may be associated with different QoS constraints, which may include a data rate, a latency constraint, or a battery power constraint (for example, some service types may be associated with a battery power constraint to a higher battery power level or a low battery power level), among other examples, and the receiving device may determine whether the receiving device supports the same service type (and the same QoS constraint) as the transmitting device based on receiving the reference signal 215.

Additionally or alternatively, the reference signal 215 may indicate a data traffic intensity of communication between the transmitting device and the receiving device. For instance, the transmitting device may indicate, via the reference signal 215, an intensity level of data traffic that the transmitting device expects to receive (in examples in which the transmitting device is a relay node 210) or that the transmitting device expects to transmit (in examples in which the transmitting device is the UE 115-a). The receiving device may compare such an indication of the data traffic intensity to a data rate or a data traffic expectancy at the receiving device to determine whether the amount of data that it expects to transmit or receive is less than or greater than the data traffic intensity indicated by the reference signal 215.

For example, if the UE 115-a receives the reference signal 215 from the relay node 210-d indicating a data traffic intensity expected or supported by the relay node 210-d (such that the relay node 210-d may transmit the reference signal 215 while receiving data from the UE 115-a), the UE 115-a may determine that the relay node 210-d is able to relay the data traffic from the UE 115-a if the indicated data traffic intensity is greater than or equal to a data traffic expectancy at the UE 115-a (for example, how much data the UE 115-a expects to transmit to a base station 105 via the relay node 210-d). In such examples, the UE 115-a may determine that the UE 115-a and the relay node 210-d support the same service type and may measure and report the signal strength associated with the reference signal 215 to the relay node 210-d. Alternatively, the UE 115-a may determine that the relay node 210-d is unable to relay the data traffic from the UE 115-a if the indicated data traffic intensity is less than the data traffic expectancy of the UE 115-a. In such examples, the UE 115-a may determine that the UE 115-a and the relay node 210-d do not support the same service type and may refrain from measuring and reporting the signal strength associated with the reference signal 215.

Additionally or alternatively, the reference signal 215 may indicate a cast type supported by the transmitting device. For example, the transmitting device may indicate, via the reference signal 215, one or more cast types according to which the transmitting device is capable of communicating or otherwise operating. In such examples, to determine whether to measure the reference signal 215, the receiving device may compare such an indication of the one or more cast types that the transmitting device supports to one or more cast types that the receiving device is capable of communicating or to one or more cast types that are expected by or suitable for the receiving device. The one or more cast types that the transmitting device may indicate via the reference signal 215 may include any one or more of a unicast cast type or mode, a multicast cast type or mode, a broadcast cast type or mode, or a groupcast cast type or mode, or any combination thereof.

The reference signal 215 may be any of a synchronization signal block (SSB), a sounding reference signal (SRS), a CSI-RS, a demodulation reference signal (DMRS) of a physical control channel, a DMRS of a physical data channel, or a dedicated reference signal used (for example, exclusively used) for indicating a service type. In some aspects, the transmitting device may transmit the reference signal 215 using a same numerology as the numerology of an active BWP. For example, the transmitting device may determine the active BWP for communication between the transmitting device and the receiving device and may use the numerology associated with the active BWP to transmit the reference signal 215.

Additionally, in some examples, the transmitting device may determine a quasi-colocation (QCL) relation or a spatial filtering for the reference signal 215 based on one or more other reference signals transmitted by the transmitting device. For instance, in examples in which the transmitting device is a relay node 210 or a base station 105 (in examples in which the transmitting device is transmitting the reference signal 215 in downlink), the transmitting device may determine a QCL relation associated with an SSB and transmit the reference signal 215 using the same QCL relation associated with the SSB. Alternatively, in examples in which the transmitting device is the UE 115-a (in examples in which the transmitting device is transmitting the reference signal 215 in uplink), the transmitting device may determine a spatial filtering associated with a physical random access channel (PRACH) message or an SRS and may transmit the reference signal 215 using the same spatial filtering associated with the PRACH message or the SRS. For example, the transmitting device may employ a TypeA QCL relation (QCL-TypeA) associated with a Doppler shift, a Doppler spread, an average delay, and a delay spread, a TypeB QCL relation (QCL-TypeB) associated with a Doppler shift and a Doppler Spread, a TypeC QCL relation (QCL-TypeC) associated with a Doppler shift and an average delay, or a TypeD QCL relation (QCL-TypeD) associated with a spatial reception parameter.

The transmitting device may indicate a service type (such as one or more of an eMBB service type, a URLLC service type, an MTC service type, a data traffic intensity, or a cast type) supported by the transmitting device via the reference signal 215 in various ways. For example, the transmitting device may indicate a supported service type by a sequence of the reference signal 215 (in examples in which the reference signal 215 is sequence-based or DMRS) or an indication included in a payload of the reference signal 215 (in examples in which the reference signal 215 includes DMRS and data), among other variants. Additional details relating to how the transmitting device may indicate a supported service type via the reference signal 215 are described in more detail with reference to FIGS. 3A and 3B.

Figure 3A:
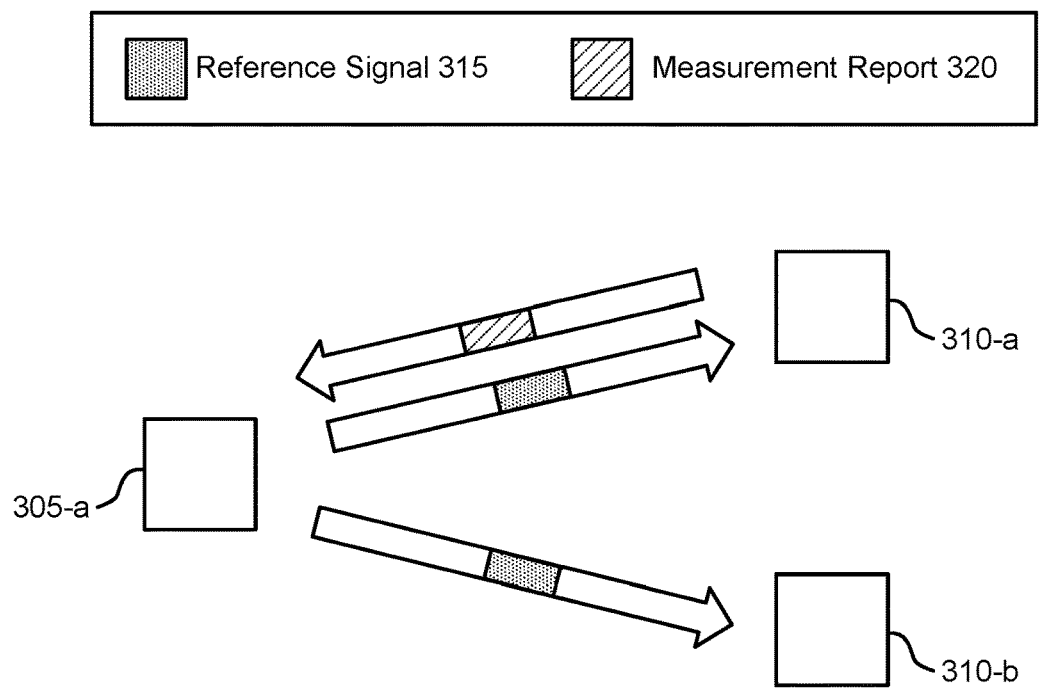
FIGS. 3A and 3B illustrate examples of signaling techniques that support service-associated reference signals in accordance with aspects of the present disclosure.
Figure 3B:
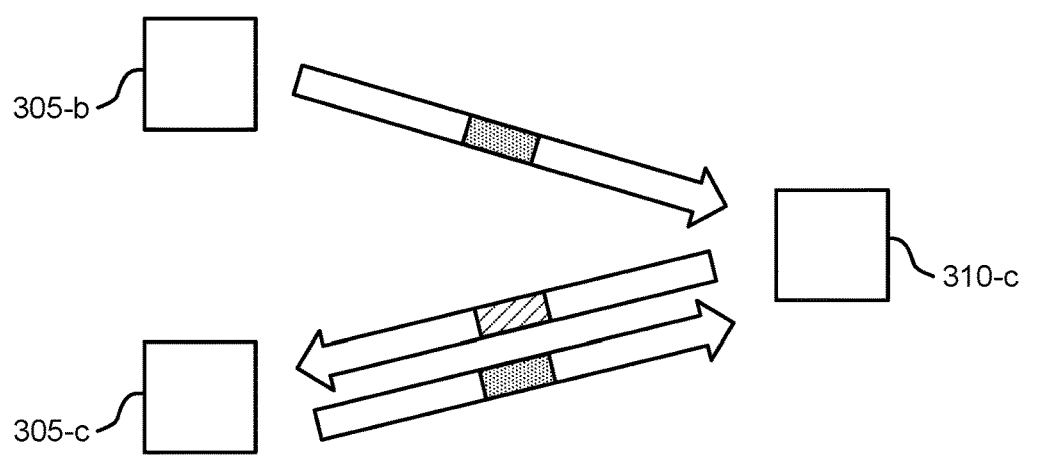

FIGS. 3A and 3B illustrate examples of signal techniques 300 and 301 that support service-associated reference signals in accordance with aspects of the present disclosure. In some examples, the signaling techniques 300 and 301 may be implemented to realize aspects of the wireless communications system 100 or the wireless communications system 200. The transmitting device 305 and the receiving device 310 may be examples of the devices described herein, including a UE, a base station, or a relay node as described with reference to FIGS. 1 and 2. For example, the transmitting device 305 may transmit, to the receiving device 310, a reference signal 315 indicating a service type supported by the transmitting device 305 and, in response to receiving the reference signal 315 and determining the indicated service type, the receiving device 310 may determine whether to measure and report a signal strength associated with the reference signal 315 via a measurement report 320. In some aspects, the receiving device 310 may determine whether the reference signal 315 indicates a service type supported by the receiving device 310 once, such as during an initial or first attempt to measure a cell or a relay.

As illustrated in FIG. 3A, a transmitting device 305-a may transmit a reference signal 315 to a receiving device 310-a and a receiving device 310-b. In some examples, the transmitting device 305-a may transmit the reference signal 315 to each of the receiving device 310-a and the receiving device 310-b as part of an uplink-led handover procedure (for example, the transmitting device 305-a may be an example of a UE in mobility or handover and the receiving device 310-a and the receiving device 310-b may be examples of relay nodes or base stations). In some other examples, the transmitting device 305-a may transmit the reference signal 315 to each of the receiving device 310-a and the receiving device 310-b as part of a downlink-led handover procedure (for example, the transmitting device 305-a may be an example of a relay node or a base station and the receiving device 310-a and the receiving device 310-b may be examples of UEs in mobility or handover).

In either example, the transmitting device 305-a may indicate a first service type supported by the transmitting device 305-a via the reference signal 315. In some implementations, the transmitting device 305-a may indicate that the transmitting device 305-a supports the first service type based on the time and frequency resources over which the transmitting device 305-a transmits the reference signal 315. For example, the transmitting device 305-a may determine that a first resource (such as a first set of time and frequency resources) corresponds to the first service type supported by the transmitting device 305-a and, as such, may transmit the reference signal 315 over the first resource. In such implementations, the receiving device 310-a and the receiving device 310-b may each receive the reference signal 315 over the first resource and determine that the transmitting device supports the first service type based on receiving the reference signal 315 over the first resource.

In some other implementations, the reference signal 315 may be a sequence-based reference signal (for example, the transmitting device may transmit the reference signal 315 using different scrambling sequences) and the transmitting device 305-a may generate a first sequence based on using a QoS ID associated with the first service type as part of the process for generating the scrambling sequences. The transmitting device 305-a may transmit the reference signal 315 using the first sequence to indicate that the transmitting device 305-a supports the first service type. In such implementations, the receiving device 310-a and the receiving device 310-b may each receive the reference signal 315, determine that the first sequence was used to transmit the reference signal 315, and determine that the transmitting device 305-a supports the first service type based on determining that the reference signal 315 was transmitted using the first sequence.

In some other implementations, the transmitting device 305-a may determine a first cell ID associated with the first service type and may transmit the reference signal 315 based on the first cell ID to indicate that the transmitting device 305-a supports the first service type. In some aspects, first cell ID may correspond to or be an example of a first physical cell ID (PCI). In some examples, the transmitting device 305-a may determine that the first service type is associated with or corresponds to a first set of cell IDs and may select the first cell ID from the first set of cell IDs. In such implementations, the receiving device 310-a and the receiving device 310-b may each receive the reference signal 315, determine the first cell ID associated with the reference signal 315, and determine that the transmitting device 305-a supports the first service type based on determining that the first cell ID is associated with the reference signal 315. In some examples, the receiving device 310-a and the receiving device 310-b may determine that the transmitting device 305-a supports the first service type based on determining that the first cell ID is within the first set of cell IDs associated with or corresponding to the first service type. Alternatively, although described in the context of a cell ID, such as a PCI, the transmitting device 305-a may transmit the reference signal 315 based on any ID that corresponds or maps to the first service type supported by the transmitting device 305-a.

In some other implementations, the reference signal 315 may be associated with a control portion and a data portion (for example, the reference signal may include both DMRS and data) and the transmitting device 305-a may include an indication of the first service type in the data portion of the reference signal 315. In such implementations, the receiving device 310-a and the receiving device 310-b may each receive the reference signal 315 and determine that the transmitting device 305-a supports the first service type based on the indication of the first service type in the data portion of the reference signal 315.

The receiving device 310-a and the receiving device 310-b, based on receiving the reference signal 315 and determining that the transmitting device 305-a supports the first service type, may determine whether the first service type is also supported by the receiving device 310-a or the receiving device 310-b, respectively. For example, the receiving device 310-a may also support the first service type and, based on receiving the reference signal 315 and determining that the transmitting device 305-a supports the first service type, may measure a signal strength associated with the reference signal 315 and transmit the measured signal strength to the transmitting device 305-a via a measurement report 320. For further example, the receiving device 310-b may support a second service type different than the first service type and, based on receiving the reference signal 315 and determining that the transmitting device 305-a supports the first service type, may refrain from measuring a signal strength associated with the reference signal 315 and likewise refrain from transmitting a measurement report 320 to the transmitting device 305-a.

In such examples, the transmitting device 305-a may determine that the receiving device 310-a is a candidate device with which to establish a connection and, if the measured signal strength indicated by the measurement report 320 satisfies a threshold signal strength (for example, exceeds a threshold or is a greater signal strength than other signal strengths provided by other receiving devices 310), the transmitting device 305-a may establish a connection with the receiving device 310-a. Likewise, the transmitting device 305-a may refrain from attempting to establish a connection with the receiving device 310-b based on not receiving a measurement report 320 from the receiving device 310-b.

Further, although described in the context of a single transmission of the reference signal 315 to each of the receiving device 310-a and the receiving device 310-b (for example, a respective reference signal 315 transmission from different receiving devices 310), the transmitting device 305-a may repeat the signaling technique 300 for each additional service type supported by the transmitting device 305-a. For example, the transmitting device 305-a may support the first service type and the second service type and may transmit a reference signal 315 indicating the first service type and transmit another reference signal 315 indicating the second service type. In such examples, the receiving device 310-b may determine to measure the reference signal 315 indicating the second service type while the receiving device 310-a may determine to refrain from measuring the reference signal 315 indicating the second service type. Similarly, the receiving device 310-a or the receiving device 310-b may support multiple service types without exceeding the scope of the present disclosure.

As illustrated in FIG. 3B, a transmitting device 305-b and a transmitting device 305-c may each transmit a reference signal 315 to a receiving device 310-c. In some examples, the transmitting device 305-b and the transmitting device 305-c may each transmit the reference signal 315 to the receiving device 310-c as part of a downlink-led handover procedure (for example, the transmitting device 305-b and the transmitting device 305-c may be examples of relay nodes or base stations and the receiving device 310-c may be an example of a UE in mobility or handover). In some other examples, the transmitting device 305-b and the transmitting device 305-c may transmit the reference signal 315 to the receiving device 310-c as part of an uplink-led handover procedure (for example, the transmitting device 305-b and the transmitting device 305-c may be examples of UEs in mobility or handover and the receiving device 310-c may be an example of a relay node or a base station).

In either example, the transmitting device 305-b and the transmitting device 305-c may each indicate service types supported by the transmitting device 305-b and the transmitting device 305-c, respectively, via the reference signals 315. For example, the transmitting device 305-b may support a first service type and may transmit a reference signal 315 indicating the first service type. Similarly, the transmitting device 305-c may support a second service type and may transmit a reference signal 315 indicating the second service type. The transmitting device 305-b and the transmitting device 305-c may indicate the first service type and the second service type, respectively, via their respective transmissions of reference signals 315 using similar techniques as those described with reference to FIG. 3A in the context of the transmitting device 305-a.

For example, in some implementations, the transmitting device 305-b may transmit the reference signal 315 over a first resource (such as a first set of time and frequency resources) that corresponds to the first service type supported by the transmitting device 305-b. Similarly, the transmitting device 305-c may transmit the reference signal 315 over a second resource (such as a second set of time and frequency resources) that corresponds to the second service type supported by the transmitting device 305-c. In some other implementations, the transmitting device 305-b may generate a first sequence based on using a first QoS ID associated with the first service type and may transmit the reference signal 315 using the first sequence to indicate that the transmitting device 305-*b* supports the first service type. Similarly, the transmitting device 305-*c* may generate a second sequence based on using a second QoS ID associated with the second service type and may transmit the reference signal 315 using the second sequence to indicate that the transmitting device 305-*b* supports the second service type.

In some other implementations, the transmitting device 305-*b* may determine a first cell ID associated with the first service type and may transmit the reference signal 315 based on the first cell ID to indicate that the transmitting device 305-*b* supports the first service type. Similarly, the transmitting device 305-*c* may determine a second cell ID associated with the second service type and may transmit the reference signal 315 based on the second cell ID to indicate that the transmitting device 305-*c* supports the second service type. In some other implementations, the transmitting device 305-*b* and the transmitting device 305-*c* may explicitly indicate the first service type and the second service type, respectively, in a payload portion of their respective reference signals 315.

The receiving device 310-*c*, based on receiving the two reference signals 315 and determining that the transmitting device 305-*b* supports the first service type and that the transmitting device 305-*c* supports the second service type, may determine whether the first service type or the second service type are supported by the receiving device 310-*c*. For example, the receiving device 310-*c* may support the second service type and, based on receiving the reference signal 315 from the transmitting device 305-*b* indicating the first service type, may refrain from measuring a signal strength associated with the reference signal 315 from the transmitting device 305-*b* and may likewise refrain from transmitting a measurement report 320 to the transmitting device 305-*b*. For further example, the receiving device 310-*c*, based on supporting the second service type and receiving the reference signal 315 from the transmitting device 305-*c* indicating the second service type, may measure a signal strength associated with the reference signal 315 transmitted by the transmitting device 305-*c* and may transmit the measured signal strength to the transmitting device 305-*c* via a measurement report 320.

Further, although described in the context of a single transmission of a reference signal 315 from each of the transmitting device 305-*b* and the transmitting device 305-*c* (for example, a respective reference signal 315 transmission from different transmitting devices 305), the transmitting device 305-*b* and the transmitting device 305-*c* may repeat the signaling technique 301 for each additional service type supported by the transmitting device 305-*b* or the transmitting device 305-*c*. For example, the transmitting device 305-*a* may support the first service type and the second service type and may transmit a reference signal 315 indicating the first service type and another reference signal 315 indicating the second service type. Similarly, the transmitting device 305-*c* may support the second service type and a third service type and may transmit a reference signal indicating the second service type and another reference signal indicating the third service type. Additionally, in some examples, the receiving device 310-*c* may support multiple service types without exceeding the scope of the present disclosure.

For example, the receiving device 310-*c* may support the first service type (which may be supported by the transmitting device 305-*a*) and the second service type (which may be supported by the transmitting device 305-*a* and the transmitting device 305-*b*). In such examples, the receiving device 310-*c* may measure reference signals 315 transmitted by both the transmitting device 305-*b* (the reference signal 315 indicating the first service type and the other reference signal 315 indicating the second service type) and the transmitting device 305-*c* (the reference signal 315 indicating the second service type). In such examples, the transmission of the measurement reports 320 corresponding to the measured reference signals may be grouped based on service type (or based on the corresponding QoS type). For example, the receiving device 310-*c* may initially transmit a first measurement report group including measurement reports 320 that include measured signal strengths associated with reference signals 315 indicating the first service type and may subsequently transmit a second measurement report group including measurement reports 320 that include measured signal strengths associated with reference signals 315 indicating the second service type. For example, the receiving device 310-*a* may transmit a first measurement report group including measurement reports 320 for UEs or cells 1 to K1 that support the first service type (or a corresponding first QoS type) and may transmit a second measurement report group including measurement reports 320 for UEs or cells to K2 that support the second service type (or a corresponding second QoS type). Alternatively, in some examples, the receiving device 310-*c* may transmit a measurement report 320 associated with the first service type and a measurement report 320 associated with a second service type at the same time (for example, in the same group).

Additionally or alternatively, the transmission of the measurement reports 320 from the receiving device 310-*c* may be separately or jointly managed based on the corresponding service type. For instance, in examples in which the transmission of the measurement reports 320 from the receiving device 310-*c* are managed separately, the receiving device 310-*c* may determine to trigger the transmission of a first measurement report 320 associated with reference signals 315 indicating the first service type and determine to trigger the transmission of a second measurement report 320 associated with reference signals 315 indicating the second service type based on different triggering conditions. For example, eMBB service types, URLLC service types, and MTC service types may be associated with different conditions for triggering the transmission of an associated with measurement report 320. In some implementations, the receiving device 310-*c* may trigger the transmission of a measurement report 320 based on a reference signal measurement, such as a thermal reference signal received power (RSRP) measurement. In such implementations, the receiving device 310-*c* may trigger the transmission of a measurement report 320 associated with URLLC-associated reference signals based on a relatively higher thermal RSRP threshold and may trigger the transmission of a measurement report 320 associated with eMBB-associated reference signals based on a relatively lower thermal RSRP threshold.

Alternatively, in examples in which the transmission of the measurement reports 320 from the receiving device 310-*c* are managed jointly, the receiving device 310-*c* may determine to trigger the transmission of the first measurement report 320 associated with reference signals 315 indicating the first service type and determine to trigger the transmission of the second measurement report 320 associated with reference signals 315 indicating the second service type based on the same triggering conditions. For example, eMBB service types and URLLC service types may be associated with the same conditions for triggering the transmission of an associated with measurement report 320, such as the same thermal RSRP threshold.

In some examples, the transmitting devices 305 and the receiving devices 310 may support the signaling techniques 300 and 301 based on a mutually understood mapping or correspondence between a set of reference signal types and a set of service types. In some aspects, different reference signal types may refer to reference signals 315 that indicate different service types (for example, reference signals 315 that are transmitted over different resources, reference signals 315 that are transmitted using different scrambling sequences, reference signals 315 that are transmitted based on different cell IDs, or reference signals 315 that include different indications in a payload portion). For instance, the mapping may indicate a correspondence between resources over which a reference signal may be received and different service types, a correspondence between a set of scrambling sequences and different service types, or a correspondence between different sets of cell IDs and different service types (for example, a first set of PCIs 900-949 may correspond to a first service type and a second set of PCIs 950-999 may correspond to a second service type), among other examples. In some implementations, a base station or a relay node may determine or configure the mapping between the set of reference signal types and the set of service types and may transmit an indication of the mapping (a mapping configuration) to a UE. The mapping may be signaled by the base station or the relay node via broadcast or unicast to UEs in sidelink communication or UEs in Uu communication.

The mapping between the set of reference signal types and the set of service types (or corresponding QoS constraints) may be in full (such that a whole set of service types are mapped to reference signal types) or in part (such that a subset of service types are mapped to reference signal types). In some aspects, the set of reference signal types may include a quantity of N reference signal types and the set of service types may include a quantity of M service types. In some examples, the mapping between the set of reference signal types and the set of service types may be one-to-one such that each different reference signal type maps to a different and unique service type (for example, M=N). In some other examples, the mapping between the set of reference signal types and the set of service types may be many-to-one such that each different reference signal type maps to a different group of service types (for example, M>N). In such examples, each reference signal type may correspond to one or multiple service types and a receiving device may determine to measure and report a signal strength associated with a reference signal if the receiving device supports any one of the one or multiple service types indicated by the reference signal.

Figure 4:
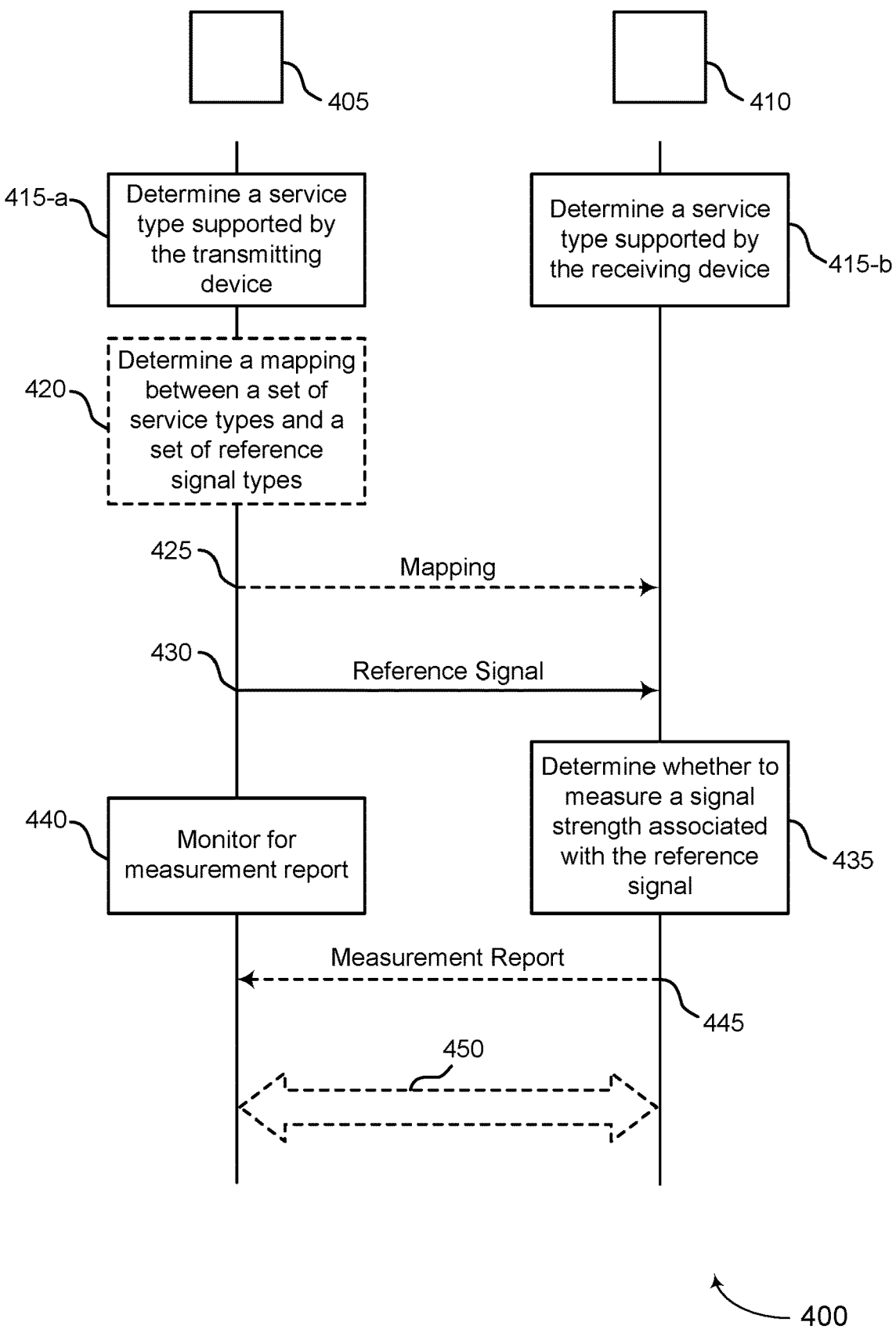
FIG. 4 illustrates an example of a process flow that supports service-associated reference signals in accordance with aspects of the present disclosure.

FIG. 4 illustrates an example of a process flow 400 that supports service-associated reference signals in accordance with aspects of the present disclosure. In some examples, the process flow 400 may implement aspects of the wireless communications system 100 and the wireless communications system 200. The process flow 400 may illustrate communications between a transmitting device 405 and a receiving device 410, which may be examples of corresponding devices described herein, such as UEs, relay nodes, or base stations. In some examples, the transmitting device 405 may transmit a reference signal indicating a service type supported by the transmitting device 405 and, in response to receiving the reference signal, the receiving device 410 may determine whether to measure the reference signal based on whether the receiving device also supports the indicated service type. Alternative examples of the process flow may be implemented, in which some features are performed in a different order than described or are not performed at all. In some examples, operations may include additional features not mentioned below, or further operations may be added.

At 415, the transmitting device 405 and the receiving device 410 may each determine their respective supported service types. The transmitting device 405 and the receiving device 410 may each support one or multiple service types and each service type may correspond to a different QoS. For example, at 415-a, the transmitting device 405 may determine a service type (such as a first service type) supported by the transmitting device 405, the service type corresponding to a QoS (such as a first QoS). Similarly, at 415-b, the receiving device 410 may determine a service type (such as a second service type) supported by the receiving device 410, the service type corresponding to a QoS (such as a second QoS).

At 420, the transmitting device 405 may, in some implementations, determine a mapping between a first set of service types and a second set of reference signal types. In some examples, the mapping may indicate how different reference signal types of the second set of reference signal types indicate different service types of the first set of service types. In some aspects, the first set of service types may include a quantity of M service types and the second set of reference signal types may include a quantity of N reference signal types, and M may be equal to or greater than N.

At 425, the transmitting device 405 may, in some implementations, transmit an indication of the mapping between the first set of service types and the second set of reference signal types to the receiving device 410. In such implementations, the transmitting device 405 may function as a base station or a relay node and the receiving device 410 may function as a UE.

At 430, the transmitting device 405 may transmit, to the receiving device 410, a reference signal indicating the service type supported by the transmitting device 405 (such as the first service type). In some examples, the transmitting device 405 may indicate the first service type supported by the transmitting device 405 based on transmitting the reference signal over a first resource that corresponds to the first service type. In some other examples, the transmitting device 405 may generate a first sequence (such as a first scrambling sequence) based on an ID associated with the first service type (such as a first QoS ID associated with the first service type) and may transmit the reference signal using the first sequence. In some other examples, the transmitting device 405 may determine a cell ID (such as a PCI) associated with the first service type and may transmit the reference signal based on the first cell ID. In such examples, the transmitting device 405 may select the first cell ID from a set of cell IDs that correspond to the first service type. In some other examples, the transmitting device 405 may include an indication of the first service type in a data portion of the reference signal (in examples in which the reference signal has DMRS and data). In some aspects, the transmitting device 405 may transmit the reference signal as part of a mobility or handover procedure or as part of a radio link measurement procedure. Additional details relating to the transmission of the reference signal are described with reference to FIG. 3.

At 435, the receiving device 410 may determine whether to measure a signal strength associated with the reference signal based on receiving the reference signal indicating the service type supported by the transmitting device 405 and based on determining whether the service type supported by the transmitting device 405 (such as the first service type) and the service type supported by the receiving device 410

(such as the second service type) are a same service type. For example, the receiving device 410 may compare the service type indicated by transmitting device 405 to the service type (or service types) supported by the receiving device 410 and may determine whether the supported service types are the same. In examples in which the receiving device 410 determines that the supported service types are the same, the receiving device 410 may determine to measure the signal strength associated with the reference signal. Alternatively, in examples in which the receiving device 410 determines that the supported services types are different, the receiving device 410 may refrain from measuring the signal strength associated with the reference signal.

At 440, the transmitting device 405 may monitor for a measurement report from the receiving device 410 based on transmitting the reference signal indicating the service type supported by the transmitting device 405.

At 445, the receiving device 410 may, in some implementations, transmit a measurement report to the transmitting device 405. In some examples, the receiving device 410 may transmit the measurement report based on determining that the service type supported by the transmitting device 405 and the service type supported by the receiving device 410 are the same service type and determining to measure the reference signal. In such examples, the transmitting device 405 may receive the measurement report based on the monitoring at 440. In some other implementations, the receiving device 410 may determine that the service type supported by the transmitting device 405 and the service type supported by the receiving device 410 are different service types and may refrain from measuring the signal strength associated with the reference signal and, likewise, refrain from transmitting the measurement report at 445.

At 450, the transmitting device 405 may, in some implementations, establish a connection with the receiving device 410 based on receiving the measurement report. For example, the transmitting device 405 may determine the measured signal strength associated with the reference signal transmitted at 430 and may compare the measured signal strength at the receiving device 410 with any other received measurement reports. In examples in which the measured signal strength at the receiving device 410 exceeds a threshold signal strength or is a greatest measured signal strength (relative to one or more other reference signal measurements), the transmitting device 405 may determine to establish the connection with the receiving device 410 and complete the mobility or handover procedure.

Figure 5:
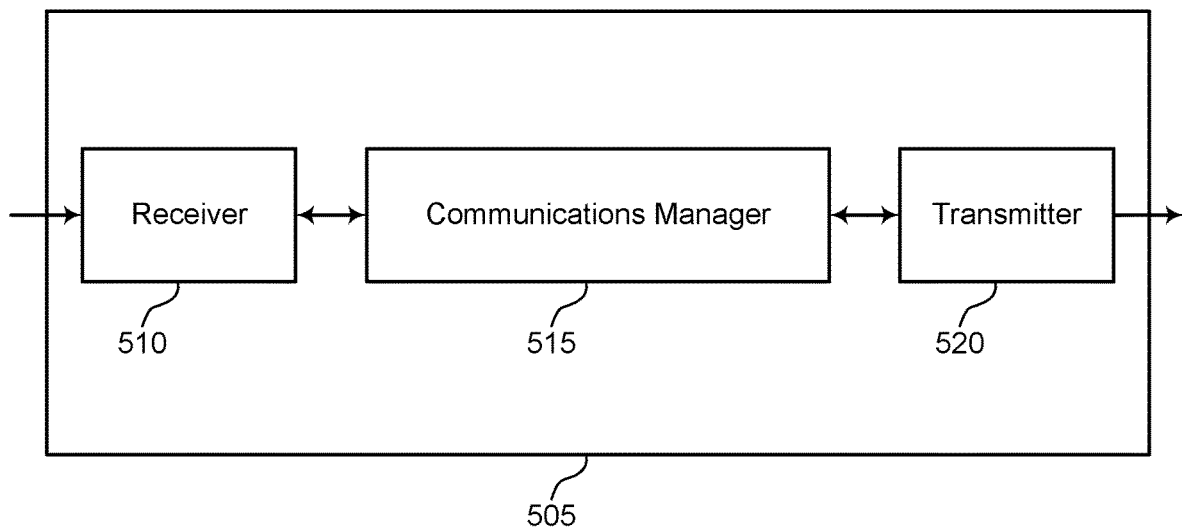
FIGS. 5 and 6 show block diagrams of devices that support service-associated reference signals in accordance with aspects of the present disclosure.

FIG. 5 shows a block diagram of a device 505 that supports service-associated reference signals in accordance with aspects of the present disclosure. The device 505 may be an example of aspects of a transmitting device or a receiving device. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to techniques for measuring service-associated reference signals). Information may be passed on to other components of the device 505. The receiver 510 may be an example of aspects of the transceiver 820 described with reference to FIG. 8. The receiver 510 may utilize a single antenna or a set of antennas.

In some implementations (such as in implementations in which the device 505 functions as a transmitting device), the communications manager 515 may determine a first service type supported by the transmitting device, the first service type corresponding to a first QoS, transmit, to a receiving device, a reference signal indicating the first service type, and monitor for a measurement report from the receiving device based on transmitting the reference signal indicating the first service type.

Additionally or alternatively, the communications manager 515 may transmit, to a receiving device, a reference signal indicating a first service type supported by the transmitting device, the first service type corresponding to a first QoS, monitor for a measurement report from the receiving device based on transmitting the reference signal indicating the first service type, and selectively establish a connection with the receiving device based on whether the measurement report is received from the receiving device during the monitoring.

In some other implementations (such as in implementations in which the device 505 functions as a receiving device), the communications manager 515 may determine a first service type supported by the receiving device, the first service type corresponding to a first QoS, receive, from a transmitting device, a reference signal indicating a second service type, determine whether to measure a signal strength associated with the reference signal based on receiving the reference signal indicating the second service type and on determining whether the first service type and the second service type are a same service type, and communicate with the transmitting device or a second transmitting device based on determining whether to measure the signal strength associated with the reference signal.

Additionally or alternatively, the communications manager 515 may receive, from a transmitting device, a reference signal indicating a first service type, measure a signal strength associated with the reference signal based on receiving the reference signal indicating the first service type and on the first service type being a same service type as a second service type supported by the receiving device that corresponds to a first QoS, and communicate with the transmitting device or a second transmitting device based on measuring the signal strength associated with the reference signal.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (for example, amplifiers, filters, antennas) coupled to the mobile device modem to enable wireless transmission and reception over one or more bands.

The communications manager 515 may be implemented to realize one or more potential advantages. In some implementations, such as in implementations in which the device 505 functions as a receiving device, the communications manager 515 may refrain from measuring and reporting a signal strength associated with a reference signaling indicating a service type that is not supported by the communications manager 515. As such, the communications manager 515 may avoid performing unnecessary processing tasks associated with the measuring and the reporting, which may improve power savings and increase battery life at the device 505.

Figure 6:
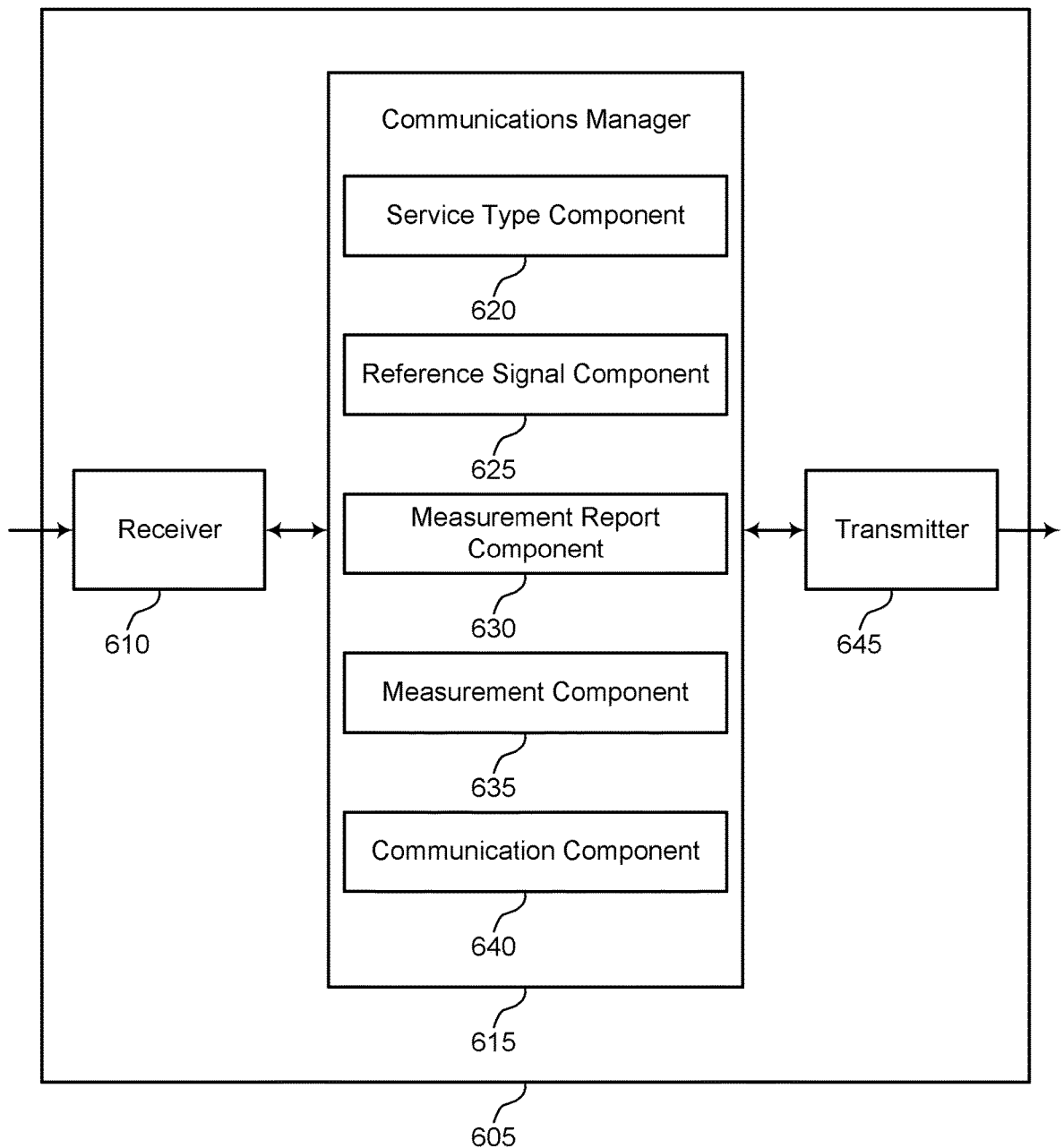

FIG. 6 shows a block diagram of a device 605 that supports service-associated reference signals in accordance with aspects of the present disclosure. The device 605 may be an example of aspects of a device 505, a transmitting device, or a receiving device. The device 605 may include a receiver 610, a communications manager 615, and a transmitter 645. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to techniques for measuring service-associated reference signals). Information may be passed on to other components of the device 605. The receiver 610 may be an example of aspects of the transceiver 820 described with reference to FIG. 8. The receiver 610 may utilize a single antenna or a set of antennas.

The communications manager 615 may include a service type component 620, a reference signal component 625, a measurement report component 630, a measurement component 635, and a communication component 640.

In some implementations, the device 605 may function as a transmitting device. In such examples, communications manager 615 may perform functions for a transmitting device. The service type component 620 may determine a first service type supported by the transmitting device, the first service type corresponding to a first QoS. The reference signal component 625 may transmit, to a receiving device, a reference signal indicating the first service type. The measurement report component 630 may monitor for a measurement report from the receiving device based on transmitting the reference signal indicating the first service type.

Additionally or alternatively, the reference signal component 625 may transmit, to a receiving device, a reference signal indicating a first service type supported by the transmitting device, the first service type corresponding to a first QoS. The measurement report component 630 may monitor for a measurement report from the receiving device based at least in part on transmitting the reference signal indicating the first service type. The communication component 640 may selectively establish a connection with the receiving device based on whether the measurement report is received from the receiving device during the monitoring.

In some other implementations, the device 605 may function as a receiving device. In such examples, communications manager 615 may perform functions for a receiving device. The service type component 620 may determine a first service type supported by the receiving device, the first service type corresponding to a first QoS. The reference signal component 625 may receive, from a transmitting device, a reference signal indicating a second service type. The measurement component 635 may determine whether to measure a signal strength associated with the reference signal based on receiving the reference signal indicating the second service type and on determining whether the first service type and the second service type are a same service type. The communication component 640 may communicate with the transmitting device or a second transmitting device based on determining whether to measure the signal strength associated with the reference signal.

Additionally or alternatively, reference signal component 625 may receive, from a transmitting device, a reference signal indicating a first service type. The measurement component 635 may measure a signal strength associated with the reference signal based on receiving the reference signal indicating the first service type and on the first service type being a same service type as a second service type supported by the receiving device that corresponds to a first QoS. The communication component 640 may communicate with the transmitting device or a second transmitting device based on measuring the signal strength associated with the reference signal.

The transmitter 645 may transmit signals generated by other components of the device 605. In some examples, the transmitter 645 may be collocated with a receiver 610 in a transceiver component. For example, the transmitter 645 may be an example of aspects of the transceiver 820 described with reference to FIG. 8. The transmitter 645 may utilize a single antenna or a set of antennas.

Figure 7:
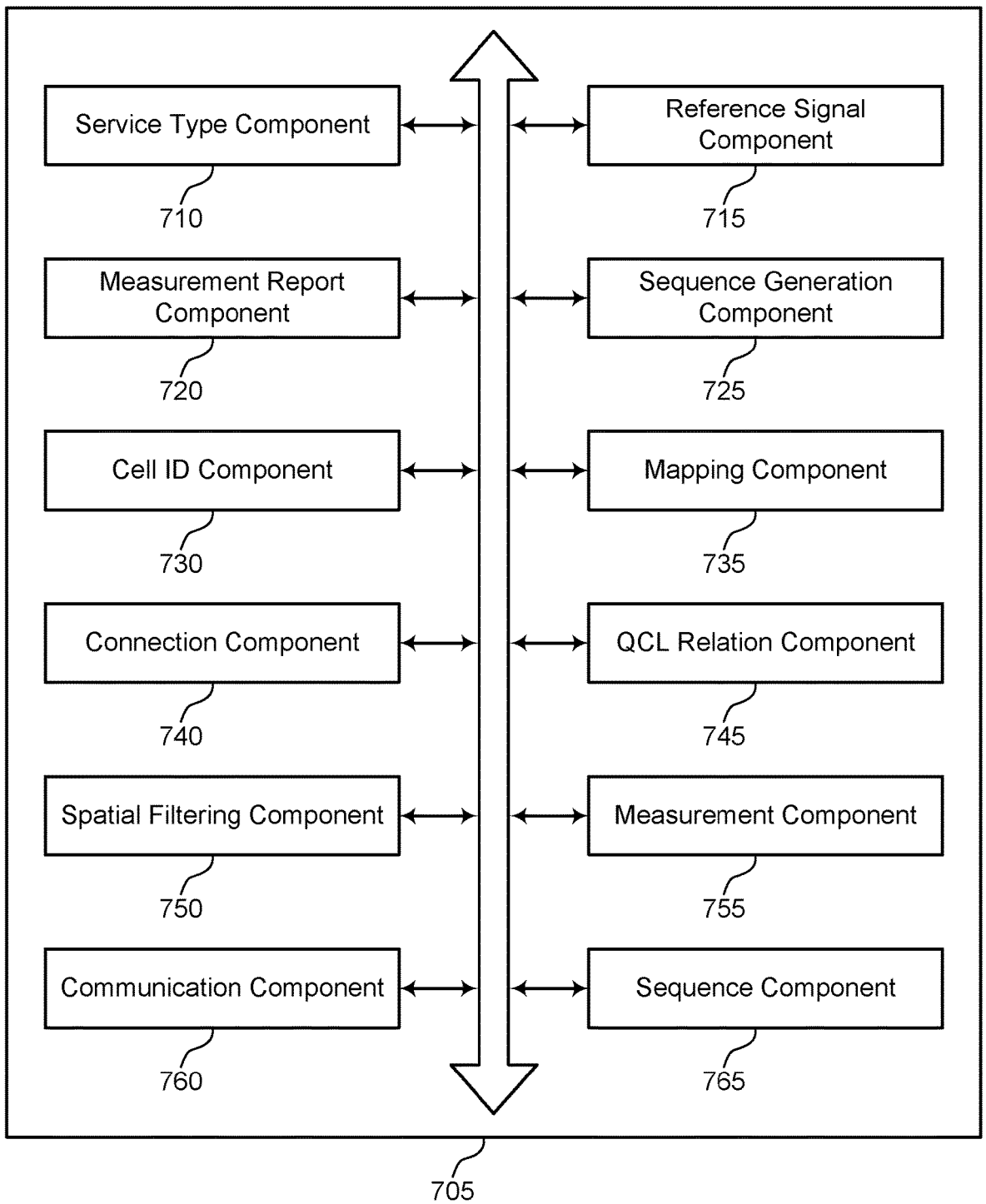
FIG. 7 shows a block diagram of a communications manager that supports service-associated reference signals in accordance with aspects of the present disclosure.

FIG. 7 shows a block diagram of a communications manager 705 that supports service-associated reference signals in accordance with aspects of the present disclosure. The communications manager 705 may include a service type component 710, a reference signal component 715, a measurement report component 720, a sequence generation component 725, a cell ID component 730, a mapping component 735, a connection component 740, a QCL relation component 745, a spatial filtering component 750, a measurement component 755, a communication component 760, and a sequence component 765. Each of these components may communicate, directly or indirectly, with one another (for example, via one or more buses).

In some implementations, the communications manager 705 may operate as part of a transmitting device.

The service type component 710 may determine a first service type supported by the transmitting device, the first service type corresponding to a first QoS. In some examples, the service type component 710 may determine a second service type supported by the transmitting device, the second service type corresponding to a second QoS. In some examples, the service type component 710 may determine that the first service type and the second service type are the same service type. In some examples, the service type component 710 may determine that the first service type and the second service type are not the same service type.

In some examples, the first service type includes an eMBB service type, a URLLC service type, or an MTC service type. In some examples, the first service type is associated with a data rate, a latency constraint, or a battery power constraint. In some examples, the first service type is associated with a data traffic intensity of communication between the transmitting device and the receiving device.

The reference signal component 715 may transmit, to a receiving device, a reference signal indicating the first service type. In some examples, the reference signal component 715 may transmit the reference signal over a first resource, the first resource corresponding to the first service type. In some examples, the reference signal component 715 may transmit, to the receiving device, a second reference signal indicating the second service type.

In some examples, the reference signal component 715 may transmit the reference signal indicating the first service type is part of a radio link measurement procedure. In some examples, the reference signal includes an SRS, a CSI-RS, a DMRS of a physical control channel, a DMRS of a physical data channel, or a dedicated reference signal used for indicating a service type.

The measurement report component 720 may monitor for a measurement report from the receiving device based on transmitting the reference signal indicating the first service type. In some examples, the measurement report component 720 may receive, from the receiving device, the measurement report based on the monitoring. In some examples, receiving the measurement report indicates that the receiving device is associated with a same service type as the transmitting device. In some examples, the measurement report component 720 may monitor for a second measurement report from the receiving device based on transmitting the second reference signal.

The sequence generation component 725 may generate a first sequence based on an ID associated with the first service type. In some examples, transmitting the reference signal indicating the first service type includes transmitting the reference signal using the first sequence. The cell ID component 730 may determine a first cell ID associated with the first service type. In some examples, transmitting the reference signal indicating the first service type includes transmitting the reference signal based on the first cell ID. In some examples, the cell ID component 730 may determine a set of cell IDs corresponding to the first service type. In some examples, the cell ID component 730 may select the first cell ID from the set of cell IDs.

The mapping component 735 may determine a mapping between a first set of service types and a second set of reference signal types. In some examples, the mapping component 735 may transmit, to the receiving device, an indication of the mapping between the first set of service types and the second set of reference signal types. In some examples, different reference signal types of the second set of reference signal types indicate different service types of the first set of service types, and each of the different service types of the first set of service types are associated with a different QoS.

The connection component 740 may establish a connection with the receiving device based on receiving the measurement report. In some examples, the connection component 740 may refrain from establishing a connection with the receiving device based on failing to receive the measurement report during the monitoring.

The QCL relation component 745 may determine a QCL relation associated with an SSB, a first QCL relation associated with the reference signal being the same as the QCL relation associated with the SSB. In some examples, transmitting the reference signal is based on determining the QCL relation associated with the SSB and the first QCL relation associated with the reference signal being the same as the QCL relation associated with the SSB.

The spatial filtering component 750 may determine a spatial filtering associated with a PRACH message or an SRS, a first spatial filtering associated with the reference signal being the same as the spatial filtering associated with the PRACH message or the SRS. In some examples, transmitting the reference signal is based on determining the spatial filtering associated with the PRACH message or the SRS and the first spatial filtering associated with the reference signal being the same as the spatial filtering associated with the PRACH message or the SRS.

In some other implementations, the communications manager 705 may operate as part of a receiving device.

In some examples, the service type component 710 may determine a first service type supported by the receiving device, the first service type corresponding to a first QoS. In some examples, the service type component 710 may determine that the second service type is supported by the transmitting device based on receiving the reference signal. In some examples, the service type component 710 may determine that the first service type and the third service type are the same service type. In some examples, the service type component 710 may determine that the first service type and the second service type are the same service type.

In some examples, the first service type or the second service type includes an eMBB service type, a URLLC service type, or an MTC service type. In some examples, the first service type or the second service type is associated with a data rate, a latency constraint, a battery power constraint, or a cast type. In some examples, the first service type or the second service type is associated with a data traffic intensity of communication between the transmitting device and the receiving device.

In some examples, the reference signal component 715 may receive, from a transmitting device, a reference signal indicating a second service type. In some examples, the reference signal component 715 may receive, from the second transmitting device, a second reference signal indicating a third service type. In some examples, the reference signal component 715 may determine that the reference signal was received over a first resource, the first resource corresponding to the second service type.

In some examples, the reference signal component 715 may receive the reference signal indicating the second service type is part of a radio link measurement procedure. In some examples, the reference signal includes an SRS, a CSI-RS, a DMRS of a physical control channel, a DMRS of a physical data channel, or a dedicated reference signal used for indicating a service type.

In some examples, the measurement report component 720 may transmit, to the transmitting device, a measurement report based on measuring the signal strength associated with the reference signal. In some examples, the measurement report component 720 may transmit, to the second transmitting device, a measurement report based on measuring the second signal strength associated with the second reference signal. In some examples, the measurement report component 720 may transmit, to the transmitting device, a first measurement report of a first measurement report group associated with the first service type. In some examples, the measurement report component 720 may transmit, to the second transmitting device, a second measurement report of a second measurement report group associated with the third service type.

The measurement component 755 may determine whether to measure a signal strength associated with the reference signal based on receiving the reference signal indicating the second service type and on determining whether the first service type and the second service type are a same service type. In some examples, the measurement component 755 may measure the signal strength associated with the reference signal based on determining that the first service type and the second service type are the same service type. In some examples, the measurement component 755 may refrain from measuring the signal strength associated with the reference signal based on determining that the first service type and the second service type are not the same service type. In some examples, the measurement component 755 may measure a second signal strength associated with the second reference signal based on determining that the first service type and the third service type are the same service type.

The communication component 760 may communicate with the transmitting device or a second transmitting device based on determining whether to measure the signal strength associated with the reference signal.

In some examples, the cell ID component 730 may determine a first cell ID associated with the reference signal, the first cell ID corresponding to the second service type. In some examples, the cell ID component 730 may determine that the first cell ID is within a set of cell IDs corresponding to the first service type.

In some examples, the mapping component 735 may receive, from the transmitting device, an indication of a mapping between a first set of service types and a second set of reference signal types. In some examples, different reference signal types of the second set of reference signal types indicate different service types of the first set of service types, and each of the different service types of the first set of service types are associated with a different QoS.

The sequence component 765 may determine a first sequence used to transmit the reference signal, the first sequence corresponding to the second service type.

Figure 8:
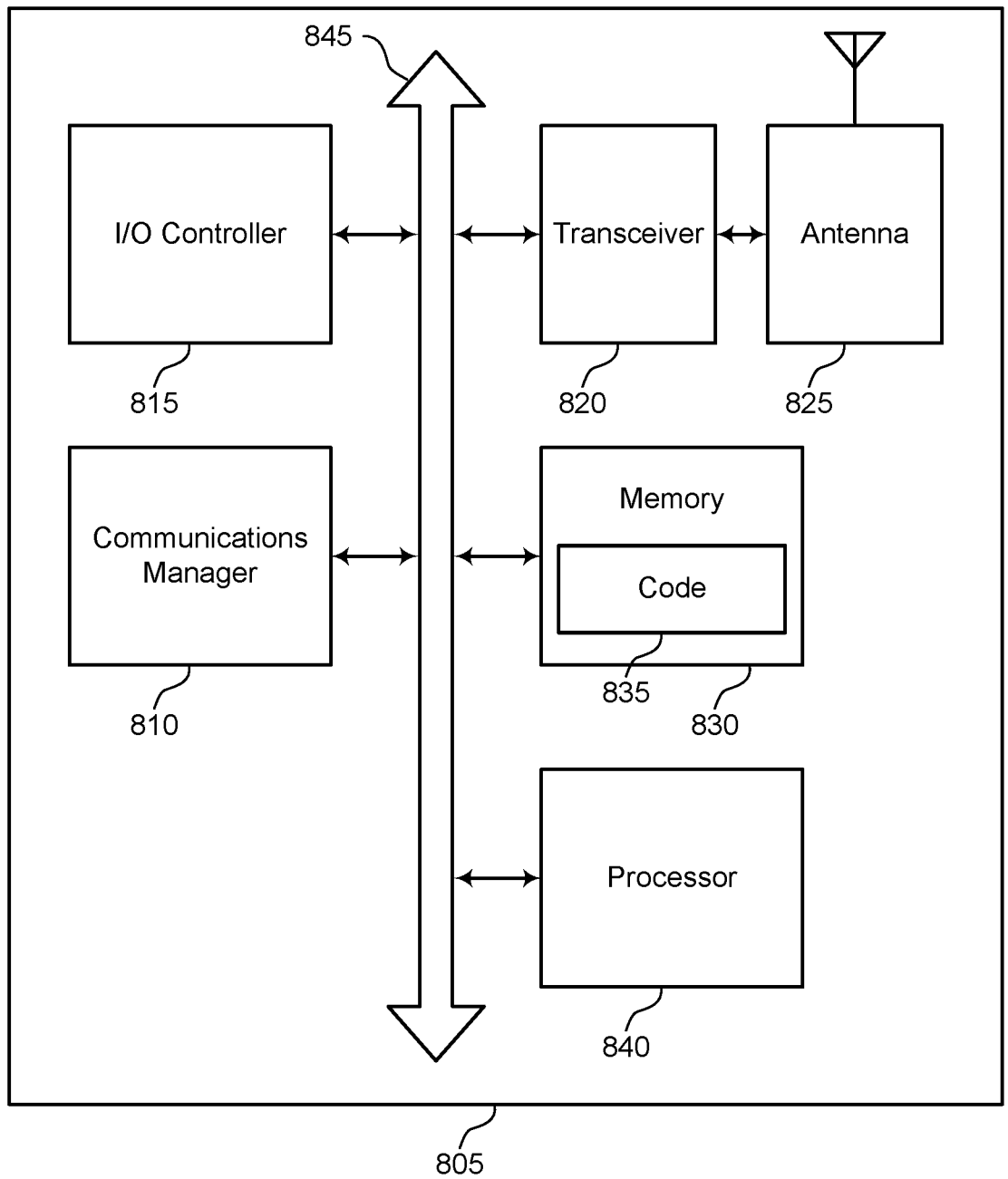
FIG. 8 shows a diagram of a system including a device that supports service-associated reference signals in accordance with aspects of the present disclosure.

FIG. 8 shows a diagram of a system including a device 805 that supports service-associated reference signals in accordance with aspects of the present disclosure. The device 805 may be an example of or include the components of device 505, device 605, a transmitting device, or a receiving device. The device 805 may include components for bi-directional voice and data communications including components for transmitting and receiving communications, including a communications manager 810, an input/output (I/O) controller 815, a transceiver 820, an antenna 825, memory 830, a processor 840, and a coding manager 850. These components may be in electronic communication via one or more buses (for example, bus 845).

In some implementations (such as in implementations in which the device 805 functions as a transmitting device), the communications manager 810 may determine a first service type supported by the transmitting device, the first service type corresponding to a first QoS, transmit, to a receiving device, a reference signal indicating the first service type, and monitor for a measurement report from the receiving device based on transmitting the reference signal indicating the first service type.

Additionally or alternatively, the communications manager 810 may transmit, to a receiving device, a reference signal indicating a first service type supported by the transmitting device, the first service type corresponding to a first QoS, monitor for a measurement report from the receiving device based on transmitting the reference signal indicating the first service type, and selectively establish a connection with the receiving device based on whether the measurement report is received from the receiving device during the monitoring.

In some other implementations (such as in implementations in which the device 805 functions as a receiving device), the communications manager 810 may determine a first service type supported by the receiving device, the first service type corresponding to a first QoS, receive, from a transmitting device, a reference signal indicating a second service type, determine whether to measure a signal strength associated with the reference signal based on receiving the reference signal indicating the second service type and on determining whether the first service type and the second service type are a same service type, and communicate with the transmitting device or a second transmitting device based on determining whether to measure the signal strength associated with the reference signal.

Additionally or alternatively, the communications manager 810 may receive, from a transmitting device, a reference signal indicating a first service type, measure a signal strength associated with the reference signal based on receiving the reference signal indicating the first service type and on the first service type being a same service type as a second service type supported by the receiving device that corresponds to a first QoS, and communicate with the transmitting device or a second transmitting device based on measuring the signal strength associated with the reference signal.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other examples, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, if executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In other examples, a memory controller may be integrated into the processor 840. The processor 840 may be configured to execute computer-readable instructions stored in a memory (for example, the memory 830) to cause the device 805 to perform various functions (for example, functions or tasks supporting techniques for measuring service-associated reference signals).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, if compiled and executed) to perform functions described herein.

Figure 9:
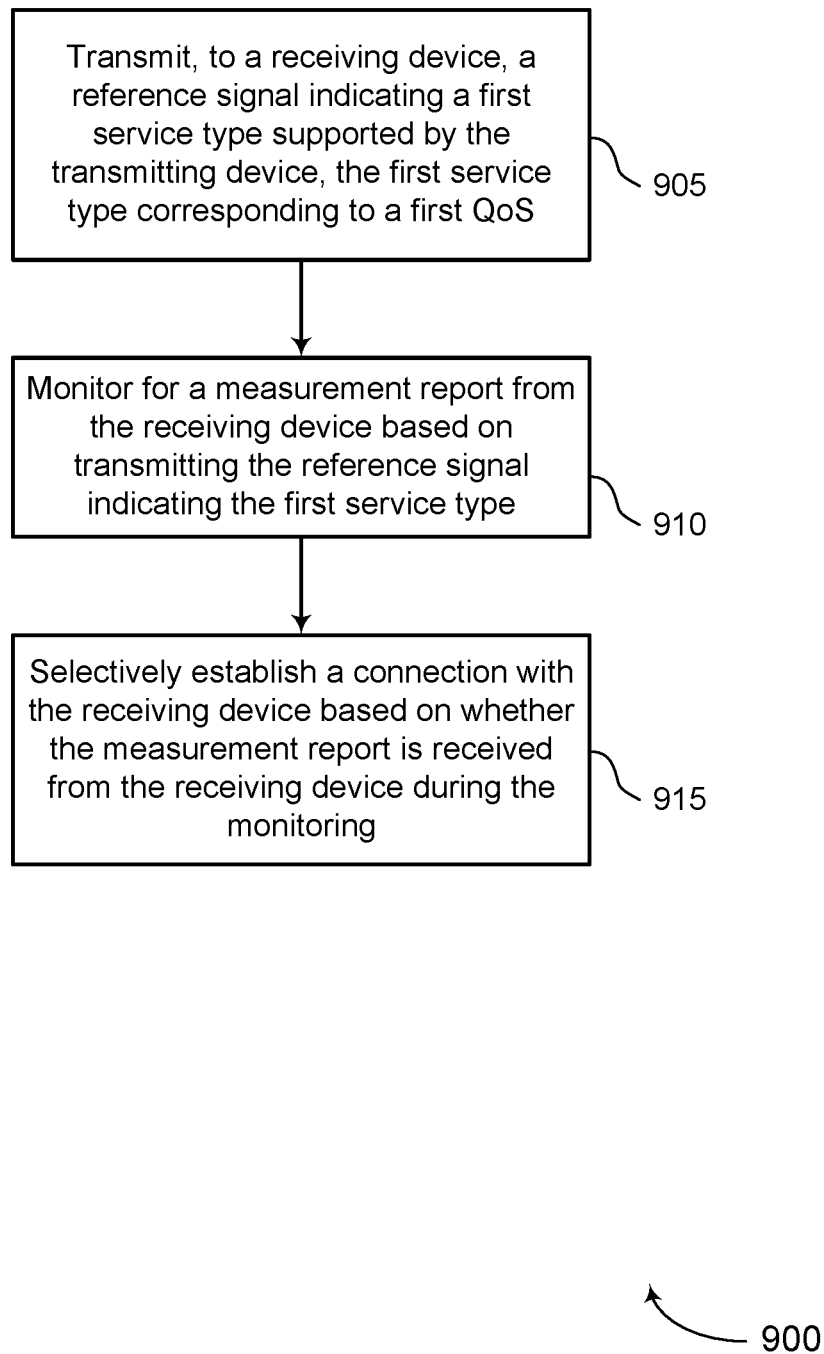
FIGS. 9-17 show flowcharts illustrating methods that support service-associated reference signals in accordance with aspects of the present disclosure.

FIG. 9 shows a flowchart illustrating a method 900 that supports service-associated reference signals in accordance with aspects of the present disclosure. The operations of method 900 may be implemented by a device (such as a transmitting device) or its components. For example, the operations of method 900 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 905, the device may transmit, to a receiving device, a reference signal indicating a first service type supported by the transmitting device, the first service type corresponding to a first QoS. The operations of 905 may be performed according to the methods described herein. In some examples, aspects of the operations of 905 may be performed by a reference signal component as described with reference to FIGS. 5-8.

At 910, the device may monitor for a measurement report from the receiving device based on transmitting the reference signal indicating the first service type. The operations of 910 may be performed according to the methods described herein. In some examples, aspects of the operations of 910 may be performed by a measurement report component as described with reference to FIGS. 5-8.

At 915, the device may selectively establish a connection with the receiving device based on whether the measurement report is received from the receiving device during the monitoring. The operations of 915 may be performed according to the methods described herein. In some examples, aspects of the operations of 915 may be performed by a connection component as described with reference to FIGS. 5-8.

Figure 10:
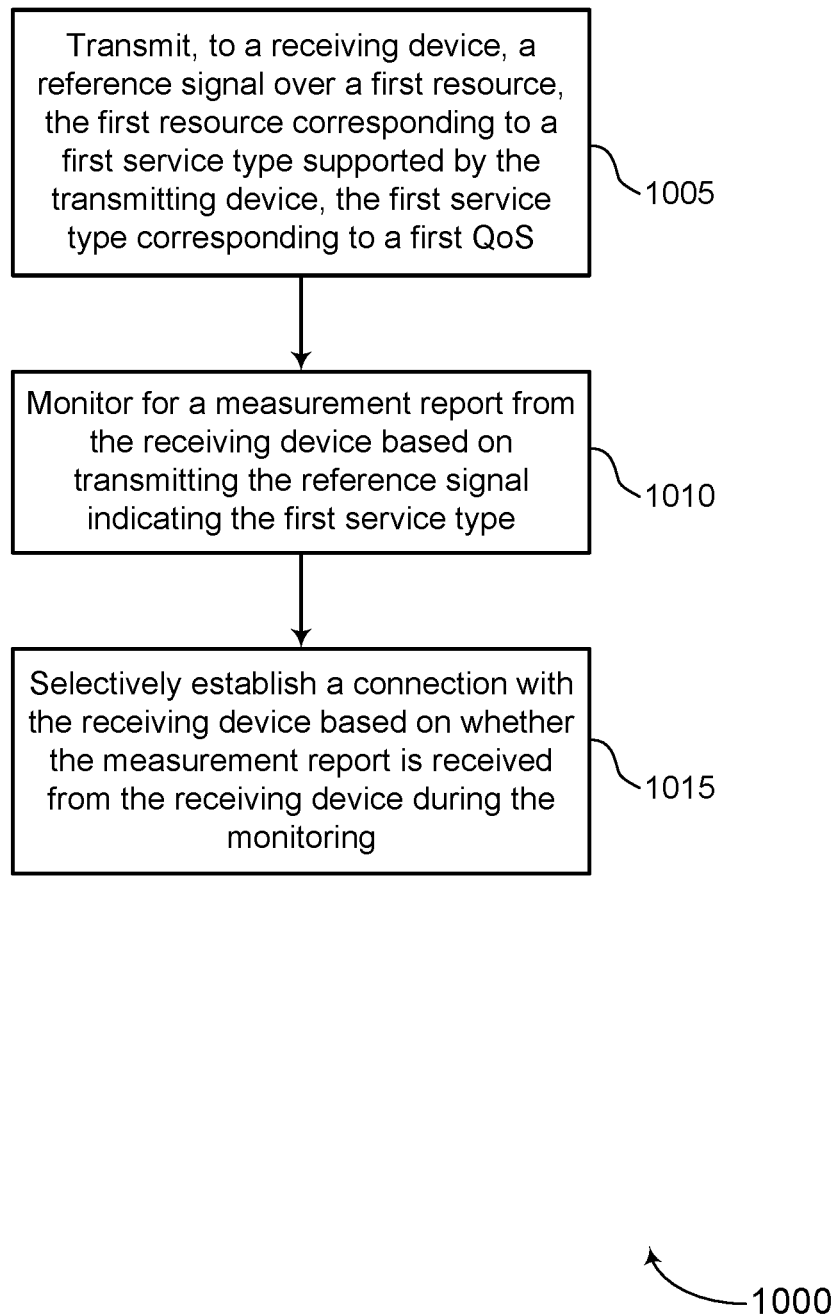

FIG. 10 shows a flowchart illustrating a method 1000 that supports service-associated reference signals in accordance with aspects of the present disclosure. The operations of method 1000 may be implemented by a device (such as a transmitting device) or its components. For example, the operations of method 1000 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1005, the device may transmit, to a receiving device, a reference signal over a first resource, the first resource corresponding to a first service type supported by the transmitting device, the first service type corresponding to a first QoS. The operations of 1005 may be performed according to the methods described herein. In some examples, aspects of the operations of 1005 may be performed by a reference signal component as described with reference to FIGS. 5-8.

At 1010, the device may monitor for a measurement report from the receiving device based on transmitting the reference signal indicating the first service type. The operations of 1010 may be performed according to the methods described herein. In some examples, aspects of the operations of 1010 may be performed by a measurement report component as described with reference to FIGS. 5-8.

At 1015, the device may selectively establish a connection with the receiving device based on whether the measurement report is received from the receiving device during the monitoring. The operations of 1015 may be performed according to the methods described herein. In some examples, aspects of the operations of 1015 may be performed by a connection component as described with reference to FIGS. 5-8.

Figure 11:
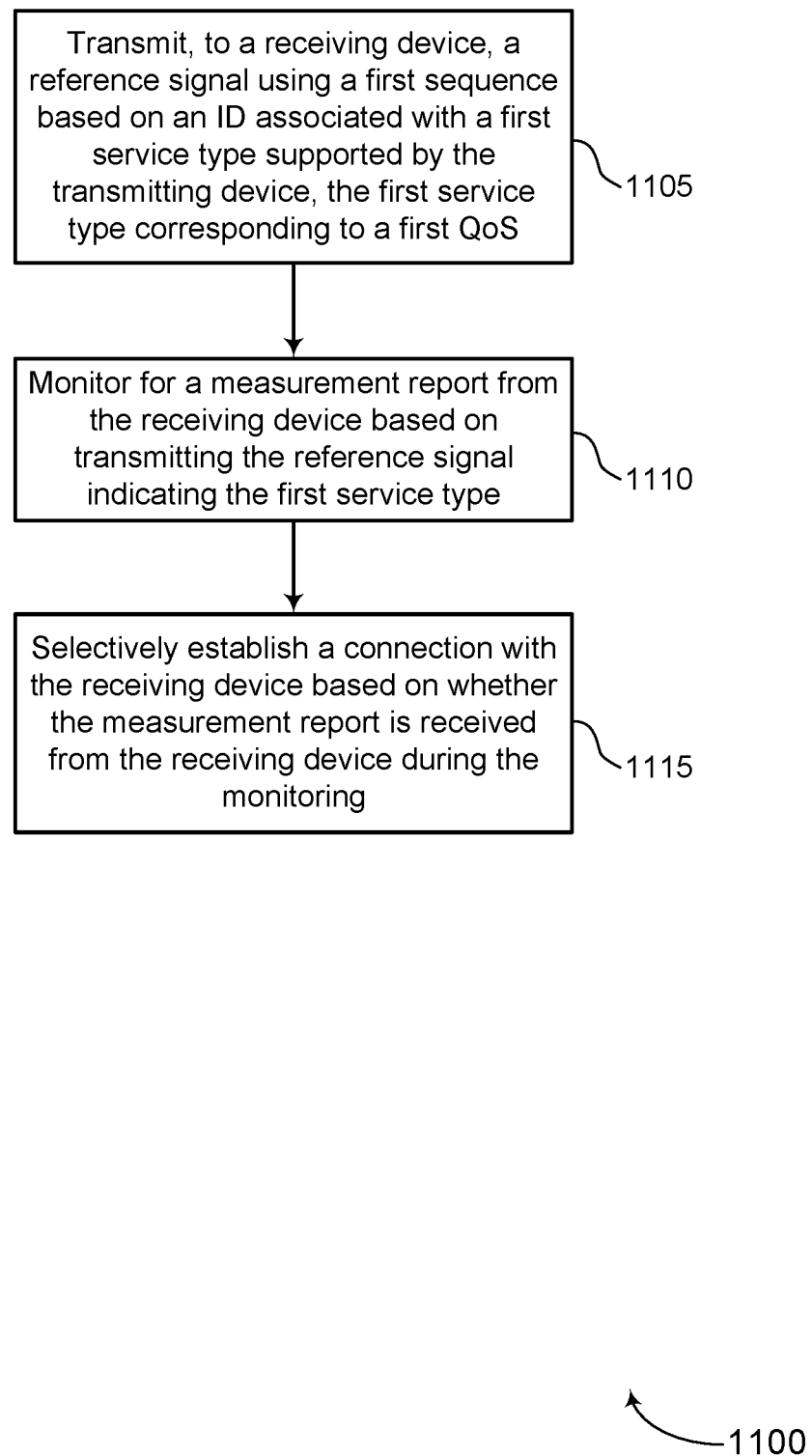

FIG. 11 shows a flowchart illustrating a method 1100 that supports service-associated reference signals in accordance with aspects of the present disclosure. The operations of method 1100 may be implemented by a device (such as a transmitting device) or its components. For example, the operations of method 1100 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1105, the device may transmit, to a receiving device, a reference signal using a first sequence based on an ID associated with a first service type supported by the transmitting device, the first service type corresponding to a first QoS. The operations of 1105 may be performed according to the methods described herein. In some examples, aspects of the operations of 1105 may be performed by a reference signal component as described with reference to FIGS. 5-8.

At 1110, the device may monitor for a measurement report from the receiving device based on transmitting the reference signal indicating the first service type. The operations of 1110 may be performed according to the methods described herein. In some examples, aspects of the operations of 1110 may be performed by a measurement report component as described with reference to FIGS. 5-8.

At 1115, the device may selectively establish a connection with the receiving device based on whether the measurement report is received from the receiving device during the monitoring. The operations of 1115 may be performed according to the methods described herein. In some examples, aspects of the operations of 1115 may be performed by a connection component as described with reference to FIGS. 5-8.

Figure 12:
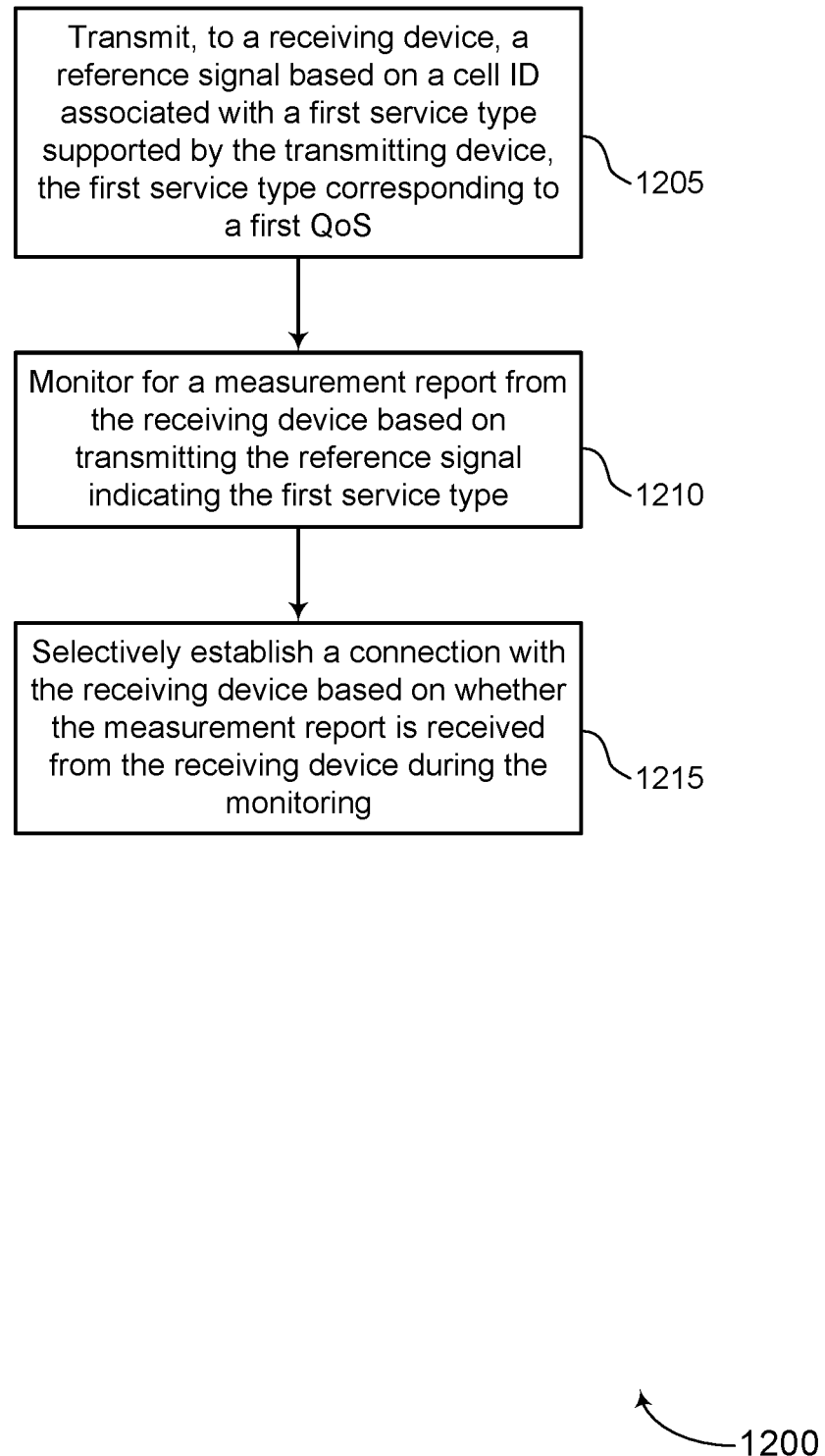

FIG. 12 shows a flowchart illustrating a method 1200 that supports service-associated reference signals in accordance with aspects of the present disclosure. The operations of method 1200 may be implemented by a device (such as a transmitting device) or its components. For example, the operations of method 1200 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1205, the device may transmit, to a receiving device, a reference signal based on a cell ID associated with a first service type supported by the transmitting device, the first service type corresponding to a first QoS. The operations of 1205 may be performed according to the methods described herein. In some examples, aspects of the operations of 1205 may be performed by a reference signal component as described with reference to FIGS. 5-8.

At 1210, the device may monitor for a measurement report from the receiving device based on transmitting the reference signal indicating the first service type. The operations of 1210 may be performed according to the methods described herein. In some examples, aspects of the operations of 1210 may be performed by a measurement report component as described with reference to FIGS. 5-8.

At 1215, the device may selectively establish a connection with the receiving device based on whether the measurement report is received from the receiving device during the monitoring. The operations of 1215 may be performed according to the methods described herein. In some examples, aspects of the operations of 1215 may be performed by a connection component as described with reference to FIGS. 5-8.

Figure 13:
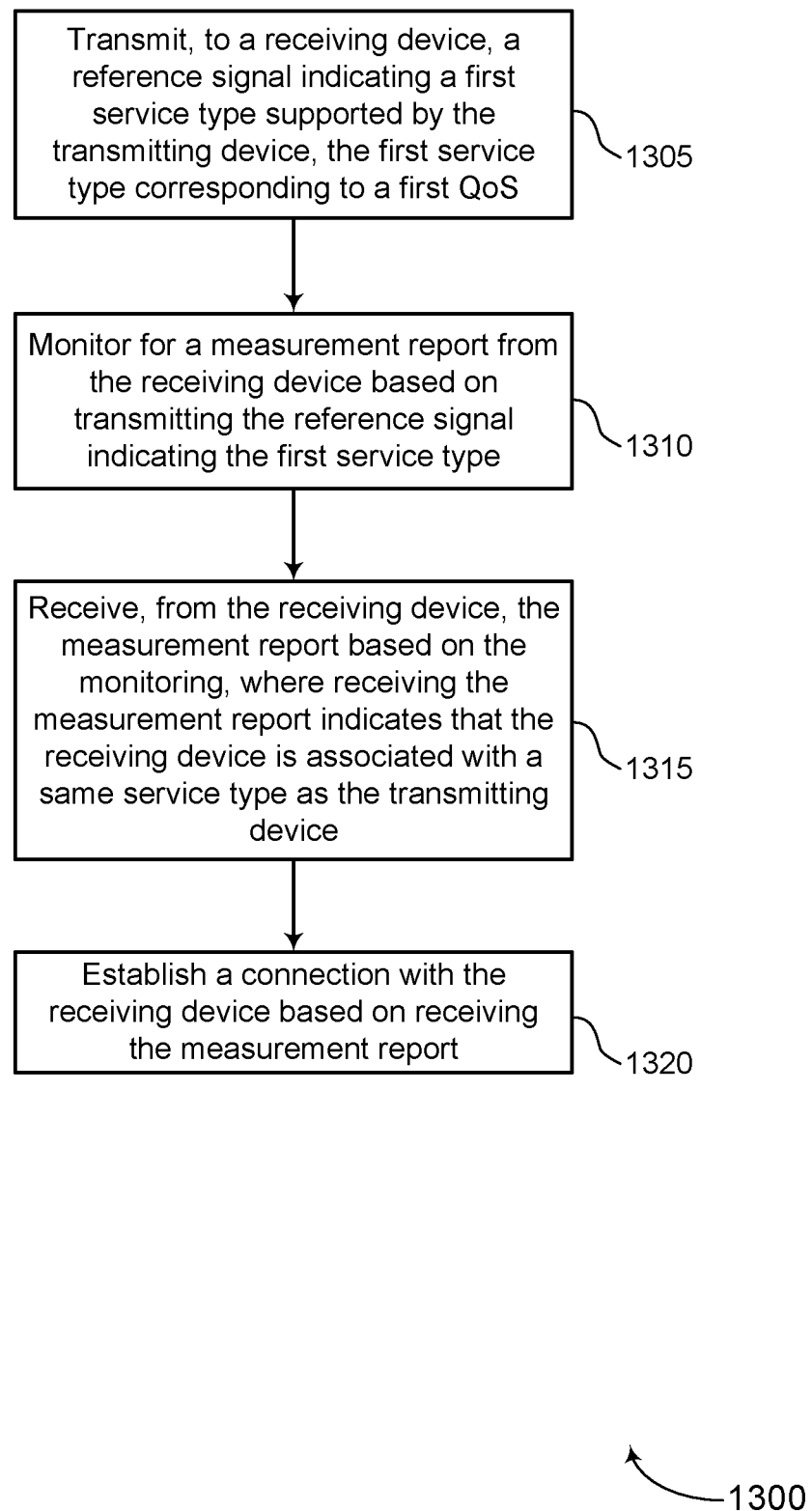

FIG. 13 shows a flowchart illustrating a method 1300 that supports service-associated reference signals in accordance with aspects of the present disclosure. The operations of method 1300 may be implemented by a device (such as a transmitting device) or its components. For example, the operations of method 1300 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1305, the device may transmit, to a receiving device, a reference signal indicating a first service type supported by the transmitting device, the first service type corresponding to a first QoS. The operations of 1305 may be performed according to the methods described herein. In some examples, aspects of the operations of 1305 may be performed by a reference signal component as described with reference to FIGS. 5-8.

At 1310, the device may monitor for a measurement report from the receiving device based on transmitting the reference signal indicating the first service type. The operations of 1310 may be performed according to the methods described herein. In some examples, aspects of the operations of 1310 may be performed by a measurement report component as described with reference to FIGS. 5-8.

At 1315, the device may receive, from the receiving device, the measurement report based on the monitoring. In some examples, receiving the measurement report indicates that the receiving device is associated with a same service type as the transmitting device. The operations of 1315 may be performed according to the methods described herein. In some examples, aspects of the operations of 1315 may be performed by a measurement report component as described with reference to FIGS. 5-8.

At 1320, the device may establish a connection with the receiving device based on receiving the measurement report. The operations of 1320 may be performed according to the methods described herein. In some examples, aspects of the operations of 1320 may be performed by a connection component as described with reference to FIGS. 5-8.

Figure 14:
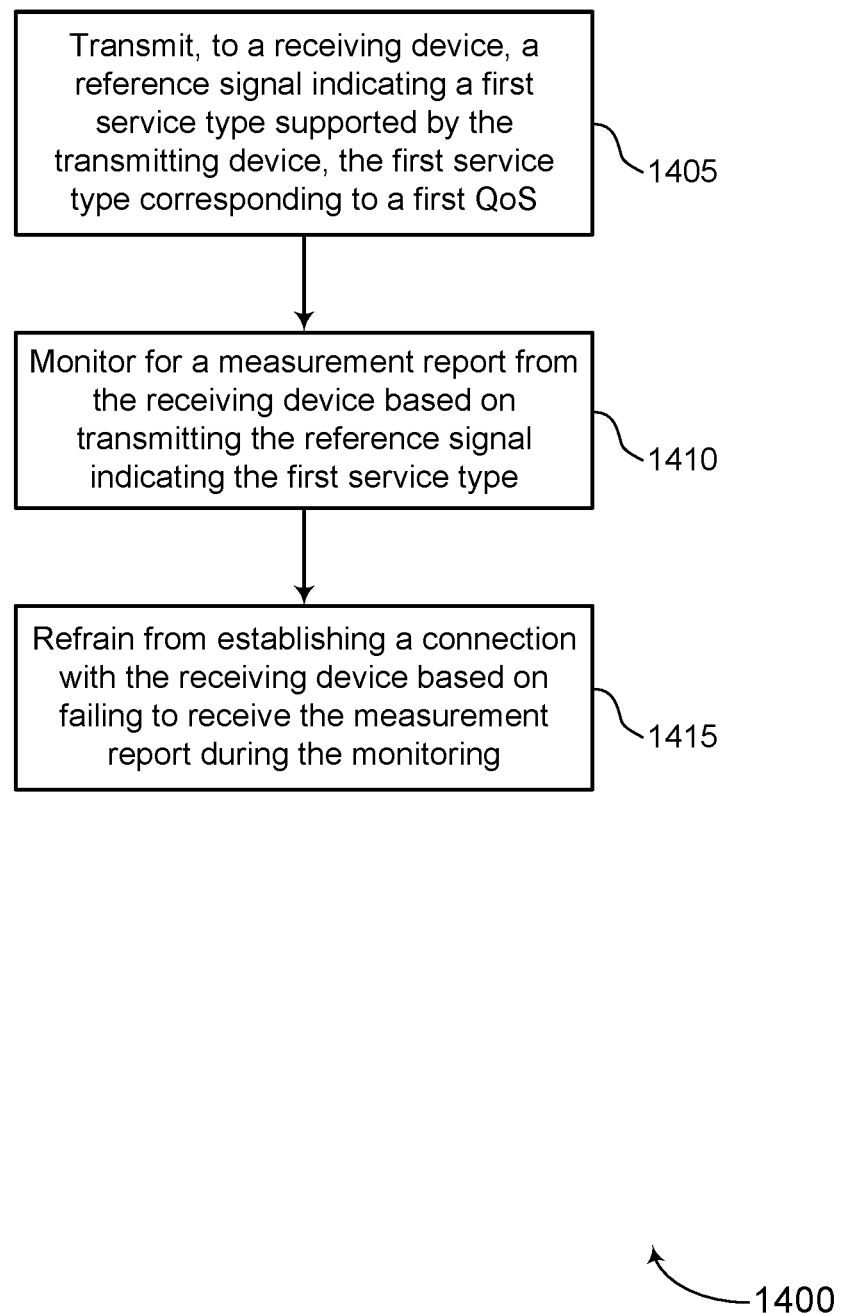

FIG. 14 shows a flowchart illustrating a method 1400 that supports service-associated reference signals in accordance with aspects of the present disclosure. The operations of method 1400 may be implemented by a device (such as a transmitting device) or its components. For example, the operations of method 1400 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1405, the device may transmit, to a receiving device, a reference signal indicating a first service type supported by the transmitting device, the first service type corresponding to a first QoS. The operations of 1405 may be performed according to the methods described herein. In some examples, aspects of the operations of 1405 may be performed by a reference signal component as described with reference to FIGS. 5-8.

At 1410, the device may monitor for a measurement report from the receiving device based on transmitting the reference signal indicating the first service type. The operations of 1410 may be performed according to the methods described herein. In some examples, aspects of the operations of 1410 may be performed by a measurement report component as described with reference to FIGS. 5-8.

At 1415, the device may refrain from establishing a connection with the receiving device based on failing to receive the measurement report during the monitoring. The operations of 1415 may be performed according to the methods described herein. In some examples, aspects of the operations of 1415 may be performed by a connection component as described with reference to FIGS. 5-8.

Figure 15:
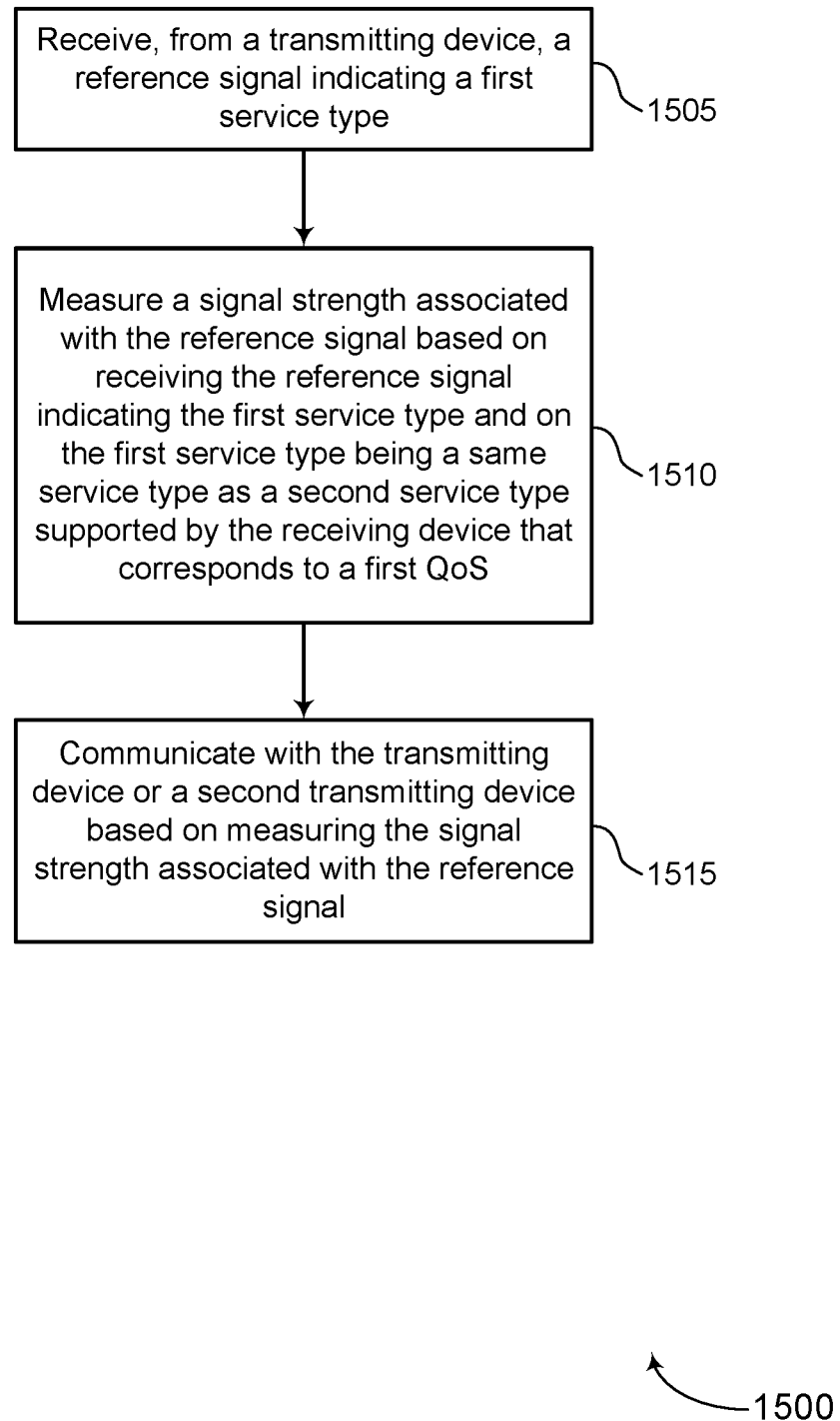

FIG. 15 shows a flowchart illustrating a method 1500 that supports service-associated reference signals in accordance with aspects of the present disclosure. The operations of method 1500 may be implemented by a device (such as a receiving device) or its components. For example, the operations of method 1500 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1505, the device may receive, from a transmitting device, a reference signal indicating a first service type. The operations of 1505 may be performed according to the methods described herein. In some examples, aspects of the operations of 1505 may be performed by a reference signal component as described with reference to FIGS. 5-8.

At 1510, the device may measure a signal strength associated with the reference signal based on receiving the reference signal indicating the first service type and on the first service type being a same service type as a second service type supported by the receiving device that corresponds to a first QoS. The operations of 1510 may be performed according to the methods described herein. In some examples, aspects of the operations of 1510 may be performed by a measurement component as described with reference to FIGS. 5-8.

At 1515, the device may communicate with the transmitting device or a second transmitting device based on measuring the signal strength associated with the reference signal. The operations of 1515 may be performed according to the methods described herein. In some examples, aspects of the operations of 1515 may be performed by a communication component as described with reference to FIGS. 5-8.

Figure 16:
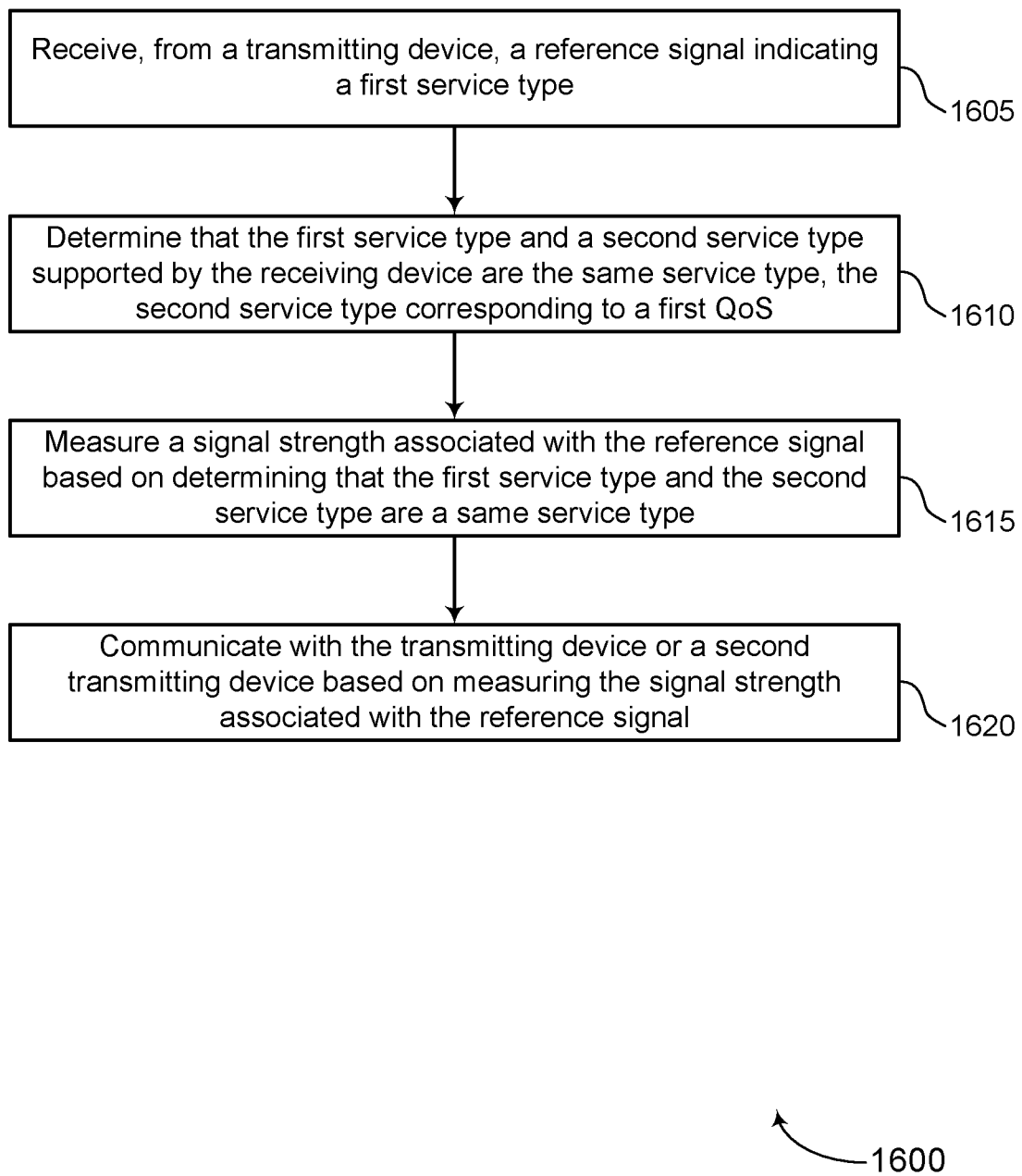

FIG. 16 shows a flowchart illustrating a method 1600 that supports service-associated reference signals in accordance with aspects of the present disclosure. The operations of method 1600 may be implemented by a device (such as a receiving device) or its components. For example, the operations of method 1600 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1605, the device may receive, from a transmitting device, a reference signal indicating a first service type. The operations of 1605 may be performed according to the methods described herein. In some examples, aspects of the operations of 1605 may be performed by a reference signal component as described with reference to FIGS. 5-8.

At 1610, the device may determine that the first service type and a second service type supported by the receiving device are the same service type, the second service type corresponding to a first QoS. The operations of 1610 may be performed according to the methods described herein. In some examples, aspects of the operations of 1610 may be performed by a service type component as described with reference to FIGS. 5-8.

At 1615, the device may measure a signal strength associated with the reference signal based on determining that the first service type and the second service type are a same service type. The operations of 1615 may be performed according to the methods described herein. In some examples, aspects of the operations of 1615 may be performed by a measurement component as described with reference to FIGS. 5-8.

At 1620, the device may communicate with the transmitting device or a second transmitting device based on measuring the signal strength associated with the reference signal. The operations of 1620 may be performed according to the methods described herein. In some examples, aspects of the operations of 1620 may be performed by a communication component as described with reference to FIGS. 5-8.

Figure 17:
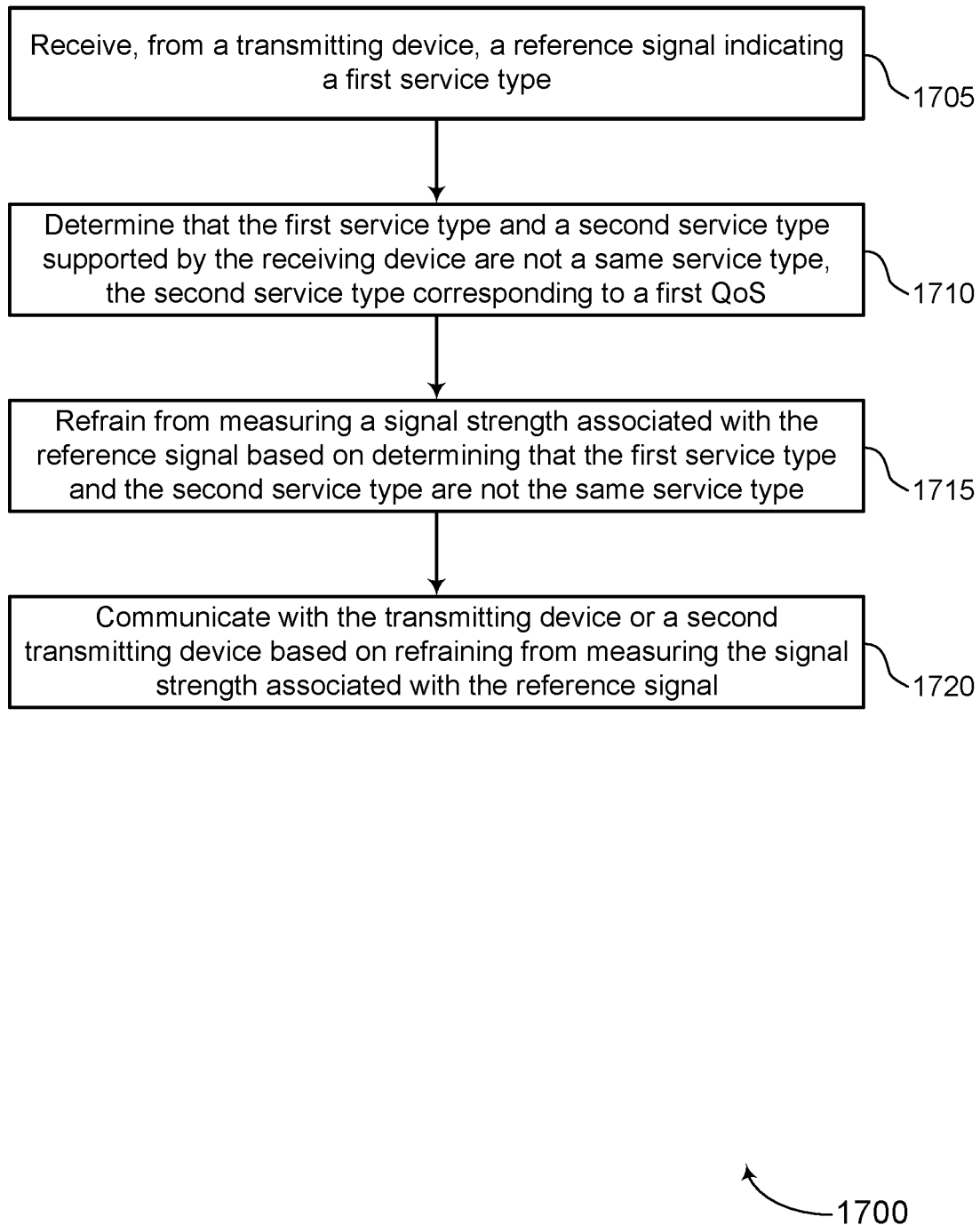

FIG. 17 shows a flowchart illustrating a method 1700 that supports service-associated reference signals in accordance with aspects of the present disclosure. The operations of method 1700 may be implemented by a device (such as a receiving device) or its components. For example, the operations of method 1700 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1705, the device may receive, from a transmitting device, a reference signal indicating a first service type. The operations of 1705 may be performed according to the methods described herein. In some examples, aspects of the operations of 1705 may be performed by a reference signal component as described with reference to FIGS. 5-8.

At 1710, the device may determine that the first service type and a second service type supported by the receiving device are not a same service type, the second service type corresponding to a first QoS. The operations of 1710 may be performed according to the methods described herein. In some examples, aspects of the operations of 1710 may be performed by a service type component as described with reference to FIGS. 5-8.

At 1715, the device may refrain from measuring a signal strength associated with the reference signal based on determining that the first service type and the second service type are not the same service type. The operations of 1715 may be performed according to the methods described herein. In some examples, aspects of the operations of 1715 may be performed by a measurement component as described with reference to FIGS. 5-8.

At 1720, the device may communicate with the transmitting device or a second transmitting device based on refraining from measuring the signal strength associated with the reference signal. The operations of 1720 may be performed according to the methods described herein. In some examples, aspects of the operations of 1720 may be performed by a communication component as described with reference to FIGS. 5-8.

The following provides an overview of aspects of the present disclosure:

Aspect 1: A method for wireless communication at a transmitting device, comprising: transmitting, to a receiving device, a reference signal indicating a first service type supported by the transmitting device, the first service type corresponding to a first QoS; monitoring for a measurement report from the receiving device based at least in part on transmitting the reference signal indicating the first service type; and selectively establishing a connection with the receiving device based at least in part on whether the measurement report is received from the receiving device during the monitoring.

Aspect 2: The method of aspect 1, wherein transmitting the reference signal indicating the first service type comprises transmitting the reference signal over a first resource, the first resource corresponding to the first service type.

Aspect 3: The method of any of aspects 1 or 2, wherein transmitting the reference signal indicating the first service type comprises transmitting the reference signal using a first sequence that is based at least in part on an ID associated with the first service type.

Aspect 4: The method of any of aspects 1-3, wherein transmitting the reference signal indicating the first service type comprises transmitting the reference signal based at least in part on a first cell ID associated with the first service type.

Aspect 5: The method of aspect 4, further comprising: determining a set of cell IDs corresponding to the first service type; and selecting the first cell ID from the set of cell IDs.

Aspect 6: The method of any of aspects 1-5, further comprising: transmitting, to the receiving device, an indication of a mapping between a first set of service types and a second set of reference signal types, the first set of service types including the first service type and the reference signal being associated with one of the second set of reference signal types.

Aspect 7: The method of aspect 6, wherein different reference signal types of the second set of reference signal types indicate different service types of the first set of service types, and each of the different service types of the first set of service types are associated with a different QoS.

Aspect 8: The method of any of aspects 1-7, further comprising: receiving, from the receiving device, the measurement report based at least in part on the monitoring, wherein receiving the measurement report indicates that the receiving device is associated with a same service type as the transmitting device, and wherein selectively establishing the connection comprises: establishing the connection with the receiving device based at least in part on receiving the measurement report.

Aspect 9: The method of any of aspects 1-7, wherein selectively establishing the connection comprises refraining from establishing the connection with the receiving device based at least in part on failing to receive the measurement report during the monitoring.

Aspect 10: The method of any of aspects 1-9, further comprising determining a quasi-colocation relation associated with a synchronization signal block, wherein transmitting the reference signal is based at least in part on a quasi-colocation relation associated with the reference signal being the same as the quasi-colocation relation associated with the synchronization signal block.

Aspect 11: The method of any of aspects 1-10, further comprising determining a spatial filtering associated with a physical random access channel message or an SRS, wherein transmitting the reference signal is based at least in part on a spatial filtering associated with the reference signal being the same as the spatial filtering associated with the physical random access channel message or the SRS.

Aspect 12: The method of any of aspects 1-11, further comprising: transmitting, to the receiving device, a second reference signal indicating a second service type supported by the transmitting device, the second service type corresponding to a second QoS; and monitoring for a second measurement report from the receiving device based at least in part on transmitting the second reference signal.

Aspect 13: The method of any of aspects 1-12, wherein the reference signal comprises an SRS, a CSI-RS, a DMRS of a physical control channel, a DMRS of a physical data channel, or a dedicated reference signal used for indicating a service type.

Aspect 14: The method of any of aspects 1-13, wherein the first service type comprises an eMBB service type, an URLLC service type, or an MTC service type.

Aspect 15: The method of any of aspects 1-14, wherein the first service type is associated with a data rate, a latency constraint, a battery power constraint, or a cast type.

Aspect 16: The method of any of aspects 1-15, wherein the first service type is associated with a data traffic intensity of communication between the transmitting device and the receiving device.

Aspect 17: The method of any of aspects 1-16, wherein transmitting the reference signal indicating the first service type is part of a radio link measurement procedure.

Aspect 18: The method of any of aspects 1-17, wherein the transmitting device comprises a UE, a base station, or a relay node and the receiving device comprises a UE, a base station, or a relay node.

Aspect 19: A method for wireless communication at a receiving device, comprising: receiving, from a transmitting device, a reference signal indicating a first service type; measuring a signal strength associated with the reference signal based at least in part on receiving the reference signal indicating the first service type and on the first service type being a same service type as a second service type supported by the receiving device that corresponds to a first QoS; and communicating with the transmitting device or a second transmitting device based at least in part on measuring the signal strength associated with the reference signal.

Aspect 20: The method of aspect 19, further comprising: determining that the first service type and the second service type are the same service type; and measuring the signal strength associated with the reference signal based at least in part on determining that the first service type and the second service type are the same service type.

Aspect 21: The method of aspect 20, wherein communicating with the transmitting device or the second transmitting device comprises transmitting, to the transmitting device, a measurement report based at least in part on measuring the signal strength associated with the reference signal.

Aspect 22: The method of any of aspects 19-21, further comprising: receiving, from the second transmitting device, a second reference signal indicating a third service type; and measuring a second signal strength associated with the second reference signal based at least in part on receiving the second reference signal indicating the third service type and on the third service type being a same service type as the second service type supported by the receiving device.

Aspect 23: The method of aspect 22, wherein communicating with the transmitting device or the second transmitting device comprises transmitting, to the second transmitting device, a measurement report based at least in part on measuring the second signal strength associated with the second reference signal.

Aspect 24: The method of any of aspects 19-23, wherein the receiving device is associated with the second service type and a third service type, and wherein communicating with the transmitting device or the second transmitting device comprises: transmitting, to the transmitting device, a first measurement report of a first measurement report group associated with the second service type; and transmitting, to the second transmitting device, a second measurement report of a second measurement report group associated with the third service type.

Aspect 25: The method of any of aspects 19-24, wherein the first service type is expected to be supported by the transmitting device based at least in part on receiving the reference signal.

Aspect 26: The method of aspect 25, wherein the first service type is expected to be supported by the transmitting device based at least in part on receiving the reference signal over a first resource, the first resource corresponding to the second service type.

Aspect 27: The method of any of aspects 25 or 26, wherein the first service type is expected to be supported by the transmitting device based at least in part on a first sequence used to transmit the reference signal, the first sequence corresponding to the second service type.

Aspect 28: The method of any of aspects 25-27, wherein the first service type is expected to be supported by the transmitting device based at least in part on a first cell ID associated with the reference signal, the first cell ID corresponding to the second service type.

Aspect 29: The method of aspect 28, further comprising determining that the first cell ID is within a set of cell IDs corresponding to the first service type.

Aspect 30: The method of any of aspects 19-29, further comprising receiving, from the transmitting device, an indication of a mapping between a first set of service types and a second set of reference signal types.

Aspect 31: The method of aspect 30, wherein different reference signal types of the second set of reference signal types indicate different service types of the first set of service types, and each of the different service types of the first set of service types are associated with a different QoS.

Aspect 32: The method of any of aspects 19-31, wherein the reference signal comprises an SRS, a CSI-RS, a DMRS of a physical control channel, a DMRS of a physical data channel, or a dedicated reference signal used for indicating a service type.

Aspect 33: The method of any of aspects 19-32, wherein the first service type or the second service type comprises an eMBB service type, an URLLC service type, or a MTC service type.

Aspect 34: The method of any of aspects 19-33, wherein the first service type or the second service type is associated with a data rate, a latency constraint, a battery power constraint, or a cast type.

Aspect 35: The method of any of aspects 19-34, wherein the first service type or the second service type is associated with a data traffic intensity of communication between the transmitting device and the receiving device.

Aspect 36: The method of any of aspects 19-35, wherein receiving the reference signal indicating the second service type is part of a radio link measurement procedure.

Aspect 37: The method of any of aspects 19-36, wherein the receiving device comprises a UE, a base station, or a relay node and the transmitting device comprises a UE, a base station, or a relay node.

Aspect 38: An apparatus for wireless communication at a transmitting device, comprising a processor; memory coupled with the processor; and instructions stored in the memory and executable by the processor to cause the apparatus to perform a method of any of aspects 1-18.

Aspect 39: An apparatus for wireless communication at a transmitting device, comprising at least one means for performing a method of any of aspects 1-18.

Aspect 40: A non-transitory computer-readable medium storing code for wireless communication at a transmitting device, the code comprising instructions executable by a processor to perform a method of any of aspects 1-18.

Aspect 41: An apparatus for wireless communication at a receiving device, comprising a processor; memory coupled with the processor; and instructions stored in the memory and executable by the processor to cause the apparatus to perform a method of any of aspects 19-37.

Aspect 42: An apparatus for wireless communication at a receiving device, comprising at least one means for performing a method of any of aspects 19-37.

Aspect 43: A non-transitory computer-readable medium storing code for wireless communication at a receiving device, the code comprising instructions executable by a processor to perform a method of any of aspects 19-37.

It is noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

What is claimed is:

1. A method for wireless communication at a transmitting device, comprising:
   transmitting a reference signal associated with a scrambling sequence that indicates a service type supported by the transmitting device or a time and frequency resource that indicates the service type supported by the transmitting device, the service type corresponding to a quality of service;
   monitoring for a measurement report from a receiving device based at least in part on transmitting the reference signal; and
   selectively establishing a connection with the receiving device based at least in part on whether the measurement report is received from the receiving device during the monitoring.

2. The method of claim 1, wherein transmitting the reference signal comprises transmitting the reference signal using the time and frequency resource that indicates the service type.

3. The method of claim 1, wherein transmitting the reference signal comprises transmitting the reference signal using the scrambling sequence, wherein the scrambling sequence is based at least in part on an identifier associated with the service type.

4. The method of claim 1, wherein transmitting the reference signal comprises transmitting the reference signal based at least in part on a cell identifier associated with the service type.

5. The method of claim 1, further comprising:
   transmitting, an indication of a mapping between a set of service types and a set of reference signal types, the set of service types including the service type and the reference signal being associated with one of the set of reference signal types.

6. The method of claim 1, further comprising:
   receiving, from the receiving device, the measurement report based at least in part on the monitoring, wherein receiving the measurement report indicates that the receiving device is associated with a same service type as the transmitting device, and wherein selectively establishing the connection comprises establishing the connection with the receiving device based at least in part on receiving the measurement report.

7. The method of claim 1, wherein selectively establishing the connection comprises refraining from establishing the connection with the receiving device based at least in part on failing to receive the measurement report during the monitoring.

8. The method of claim 1, further comprising determining a quasi-colocation relation associated with a synchronization signal block, wherein transmitting the reference signal is based at least in part on a quasi-colocation relation associated with the reference signal being the same as the quasi-colocation relation associated with the synchronization signal block.

9. The method of claim 1, further comprising determining a spatial filtering associated with a physical random access channel message or a sounding reference signal, wherein transmitting the reference signal is based at least in part on a spatial filtering associated with the reference signal being the same as the spatial filtering associated with the physical random access channel message or the sounding reference signal.

10. The method of claim 1, further comprising:
    transmitting, a second reference signal indicating a second service type supported by the transmitting device, the second service type corresponding to a second quality of service; and
    monitoring for a second measurement report from the receiving device based at least in part on transmitting the second reference signal.

11. The method of claim 1, wherein the service type comprises an enhanced mobile broadband service type, an ultra-reliable low latency communication service type, or a machine type communication service type.

12. The method of claim 1, wherein the service type is associated with a data rate, a latency constraint, a battery power constraint, a data traffic intensity of communication between the transmitting device and the receiving device, or a cast type.

13. A method for wireless communication at a receiving device, comprising:
    receiving, from a transmitting device, a reference signal associated with a scrambling sequence that indicates a service type or a time and frequency resource that indicates the service type;
    measuring a signal strength associated with the reference signal based at least in part on receiving the reference signal and on the service type being a same service type as a second service type supported by the receiving device that corresponds to a quality of service; and
    communicating with the transmitting device or a second transmitting device based at least in part on measuring the signal strength associated with the reference signal.

14. The method of claim 13, wherein communicating with the transmitting device or the second transmitting device comprises transmitting, to the transmitting device, a measurement report based at least in part on measuring the signal strength associated with the reference signal.

15. The method of claim 13, further comprising:
    receiving, from the second transmitting device, a second reference signal indicating a third service type; and
    measuring a second signal strength associated with the second reference signal based at least in part on receiving the second reference signal indicating the third service type and on the third service type being a same service type as the second service type supported by the receiving device.

16. The method of claim 15, wherein communicating with the transmitting device or the second transmitting device comprises transmitting, to the second transmitting device, a measurement report based at least in part on measuring the second signal strength associated with the second reference signal.

17. The method of claim 13, wherein the receiving device is associated with the second service type and a third service type, and wherein communicating with the transmitting device or the second transmitting device comprises:
 transmitting, to the transmitting device, a first measurement report of a first measurement report group associated with the second service type; and
 transmitting, to the second transmitting device, a second measurement report of a second measurement report group associated with the third service type.

18. The method of claim 13, wherein the service type is expected to be supported by the transmitting device based at least in part on receiving the reference signal.

19. The method of claim 18, wherein the service type is expected to be supported by the transmitting device based at least in part on:
 receiving the reference signal using the time and frequency resource that indicates the service type;
 the scrambling sequence that indicates the service type being used to transmit the reference signal or
 a cell identifier associated with the reference signal, the cell identifier corresponding to the service type.

20. The method of claim 13, further comprising:
 receiving, from the transmitting device, an indication of a mapping between a set of service types and a set of reference signal types, the set of service types including the service type and the reference signal being associated with one of the set of reference signal types.

21. The method of claim 13, wherein the service type or the second service type comprises an enhanced mobile broadband service type, an ultra-reliable low latency communication service type, or a machine type communication service type.

22. The method of claim 13, wherein the service type or the second service type is associated with a data rate, a latency constraint, a battery power constraint, a data traffic intensity of communication between the transmitting device and the receiving device, or a cast type.

23. An apparatus for wireless communication at a transmitting device, comprising:
 memory storing processor-executable code; and
 one or more processors coupled with the memory and operable to execute the code to cause the transmitting device to:
  transmit a reference signal associated with a scrambling sequence that indicates a service type supported by the transmitting device or a time and frequency resource that indicates the service type supported by the transmitting device, the service type corresponding to a quality of service;
  monitor for a measurement report from a receiving device based at least in part on transmitting the reference signal; and
  selectively establish a connection with the receiving device based at least in part on whether the measurement report is received from the receiving device during the monitoring.

24. The apparatus of claim 23, wherein, to transmit the reference signal, the one or more processors are operable to execute the code to cause the transmitting device to transmit the reference signal using the time and frequency resource that indicates the service type.

25. The apparatus of claim 23, wherein, to transmit the reference signal, the one or more processors are operable to execute the code to cause the transmitting device to transmit the reference signal using the scrambling sequence, wherein the scrambling sequence is based at least in part on an identifier associated with the service type.

26. The apparatus of claim 23, wherein, to transmit the reference signal, the one or more processors are operable to execute the code to cause the transmitting device to transmit the reference signal based at least in part on a cell identifier associated with the service type.

27. The apparatus of claim 23, wherein the one or more processors are operable to execute the code to cause the transmitting device to:
 transmit an indication of a mapping between a set of service types and a set of reference signal types, the set of service types including the service type and the reference signal being associated with one of the set of reference signal types.

28. An apparatus for wireless communication at a receiving device, comprising:
 memory storing processor-executable code; and
 one or more processors coupled with the memory and operable to execute the code to cause the receiving device to:
  receive, from a transmitting device, a reference signal associated with a scrambling sequence that indicates a service type or a time and frequency resource that indicates the service type;
  measure a signal strength associated with the reference signal based at least in part on receiving the reference signal and on the service type being a same service type as a second service type supported by the receiving device that corresponds to a quality of service; and
  communicate with the transmitting device or a second transmitting device based at least in part on measuring the signal strength associated with the reference signal.

29. The apparatus of claim 28, wherein, to communicate with the transmitting device or the second transmitting device, the one or more processors are operable to execute the code to cause the receiving device to transmit, to the transmitting device, a measurement report based at least in part on measuring the signal strength associated with the reference signal.

30. The apparatus of claim 28, wherein the one or more processors are operable to execute the code to cause the receiving device to:
 receive, from the second transmitting device, a second reference signal indicating a third service type; and
 measure a second signal strength associated with the second reference signal based at least in part on receiving the second reference signal indicating the third service type and on the third service type being a same service type as the second service type supported by the receiving device.

* * * * *